(12) United States Patent
Sun et al.

(10) Patent No.: US 11,012,191 B2
(45) Date of Patent: May 18, 2021

(54) REFERENCE SIGNAL INDICATION METHOD AND APPARATUS

(71) Applicant: Huawei Technologies Co., Ltd., Shenzhen (CN)

(72) Inventors: Yu Sun, Shanghai (CN); Yi Qin, Kista (SE); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/674,330

(22) Filed: Nov. 5, 2019

(65) Prior Publication Data
US 2020/0076537 A1 Mar. 5, 2020

Related U.S. Application Data

(63) Continuation of application No. PCT/CN2018/078814, filed on Mar. 13, 2018.

(30) Foreign Application Priority Data

May 5, 2017 (CN) .......................... 201710312731.3

(51) Int. Cl.
*H04L 1/06* (2006.01)
*H04J 11/00* (2006.01)
(Continued)

(52) U.S. Cl.
CPC .............. *H04L 1/06* (2013.01); *H04J 11/005* (2013.01); *H04L 5/001* (2013.01); *H04L 27/2613* (2013.01); *H04J 2011/0009* (2013.01)

(58) Field of Classification Search
CPC ....... H04L 5/0048; H04L 5/0051; H04L 1/06; H04L 27/2613; H04J 11/005; H04J 2011/0009; H05L 5/001
See application file for complete search history.

(56) References Cited

U.S. PATENT DOCUMENTS

2014/0086085 A1 3/2014 Zheng et al.
2016/0006594 A1 1/2016 Persson et al.
(Continued)

FOREIGN PATENT DOCUMENTS

CN 102780532 A 11/2012
WO 2014154294 A1 10/2014

OTHER PUBLICATIONS

"On PT-RS design for NR," 3GPP TSG RAN WG1#88, Athens, Greece, R1-1703182, pp. 1-8, 3rd Generation Partnership Project, Valbonne, France (Feb. 13-17, 2017).
(Continued)

*Primary Examiner* — Sung S Ahn
(74) *Attorney, Agent, or Firm* — Leydig, Voit & Mayer, Ltd.

(57) ABSTRACT

This application provides a reference signal indication method and apparatus. The method includes: transmitting, by a terminal device, a phase tracking reference signal (PTRS) to a network device based on a time domain density; and receiving, by the network device, the PTRS transmitted by the terminal device based on the time domain density, where the time domain density is a density in a discrete Fourier transform spread orthogonal frequency division multiplexing (DFT-s-OFDM) waveform. Therefore, successful PTRS transmission can be ensured.

20 Claims, 15 Drawing Sheets

(51) Int. Cl.
  *H04L 5/00* (2006.01)
  *H04L 27/26* (2006.01)

(56) References Cited

U.S. PATENT DOCUMENTS

2018/0091350 A1\* 3/2018 Akkarakaran ........ G01S 13/346
2018/0124796 A1\* 5/2018 Noh ..................... H04W 28/04

OTHER PUBLICATIONS

"Further details for PT-RS design," 3GPP TSG RAN WG1 Meeting #88b, R1-1704240, Spokane, USA, pp. 1-5, 3rd Generation Partnership Project, Valbonne, France (Apr. 3-7, 2017).
"Phase-tracking reference signal for DFT-s-OFDM systems," 3GPP TSG RAN WGI Meeting #88bis, Spokane, USA, R1-1705101, pp. 1-6, 3rd Generation Partnership Project, Valbonne, France (Apr. 3-7, 2017).

\* cited by examiner

☐ Data sampling point   ▨ PTRS sampling point

☐ Data sampling point   ▨ PTRS sampling point

REFERENCE SIGNAL INDICATION METHOD AND APPARATUS

CROSS-REFERENCE TO RELATED APPLICATIONS

This application is a continuation of International Application No. PCT/CN2018/078814, filed on Mar. 13, 2018, which claims priority to Chinese Patent Application No. 201710312731.3, filed on May 5, 2017. The disclosures of the aforementioned applications are hereby incorporated by reference in their entireties.

TECHNICAL FIELD

This application relates to the communications field, and more specifically, to a method and an apparatus for transmitting a phase tracking reference signal (PTRS) in the communications field.

BACKGROUND

With development of a network system, a higher communication rate and a larger capacity are required, and more high-frequency resources are also required. However, a frequency increase is accompanied with an increase of phase noise generated by a random jitter of a frequency device, that is, a local oscillator. Therefore, adverse impact of phase noise in high-frequency wireless communication cannot be ignored. Usually, a transmit end may transmit a PTRS that is known in advance; and a receive end may estimate phase noise based on the received PTRS. Due to relatively high time randomicity of the phase noise, how the transmit end transmits the PTRS is a problem to be urgently resolved.

SUMMARY

This application provides a reference signal indication method and apparatus, so that a PTRS can be transmitted between a network device and a terminal device and that phase noise can be estimated based on the PTRS.

According to a first aspect, a reference signal indication method is provided and includes: transmitting, by a network device, first indication information to a terminal device, where the first indication information is used to indicate a time domain density and/or a frequency domain density for transmitting a PTRS by the terminal device or the network device.

In an embodiment of this application, the network device may transmit the PTRS on the time domain density, the frequency domain density, or a time-frequency density indicated by the first indication information, and the terminal device receives, on a corresponding time domain resource, frequency domain resource, or time-frequency domain resource based on the indication of the first indication information, the PTRS transmitted by the network device, so that the terminal device can correctly receive the PTRS transmitted by the network device; or the terminal device may transmit the PTRS on the time domain density, the frequency domain density, or a time-frequency density indicated by the first indication information, and the network device receives, on a corresponding time domain resource, frequency domain resource, or time-frequency domain resource based on the indication of the first indication information, the PTRS transmitted by the terminal device, so that the network device can correctly receive the PTRS transmitted by the terminal device. To be specific, both the network device and the terminal device know a resource density for transmitting the PTRS. Therefore, successful PTRS transmission can be ensured, and a receive end can estimate phase noise based on the received PTRS.

Optionally, that the first indication information is used to indicate a time domain density and/or a frequency domain density for transmitting a PTRS by the terminal device or the network device is specifically: the first indication information is used to indicate the time domain density, the frequency domain density, or the time-frequency density for transmitting the PTRS by the terminal device, or the first indication information is used to indicate the time domain density, the frequency domain density, or the time-frequency density for transmitting the PTRS by the network device.

Optionally, the terminal device or the network device maps, based on the first indication information, the PTRS to a subcarrier position and/or a symbol position predefined by a protocol; or the terminal device maps, based on the first indication information, the PTRS to a subcarrier position and/or a symbol position configured by the network device by using radio resource control (RRC) signaling or system information. Certainly, the terminal device may also determine, based on a cell identity of the terminal device, the subcarrier position and/or the symbol position to which the PTRS is mapped. This is not limited in this embodiment of this application.

Optionally, the time domain density is a time domain density for transmitting PTRSs by a plurality of terminal devices in a multi-user multiple-input multiple-output (MU-MIMO) scenario, the frequency domain density is a frequency domain density for transmitting PTRSs by the plurality of terminal devices in the MIMO scenario, and the plurality of terminal devices include the terminal device. For example, when the plurality of terminal devices communicate with the network device simultaneously on a same time-frequency resource, if some terminal devices transmit PTRSs on a specific time-frequency resource, and remaining terminal devices transmit data on the specific time-frequency resource, there is mutual interference between the data and the PTRSs. If a same time-frequency resource is used for transmitting PTRSs by the plurality of terminal devices or transmitting PTRSs by the network device to the plurality of terminal devices, interference between uplink or downlink PTRSs of different terminal devices may be randomized by scrambling a random sequence. Therefore, a same time domain density, frequency domain density, or time-frequency density is set for uplink or downlink PTRSs of the plurality of terminal devices, that is, the plurality of terminal devices may transmit or receive the PTRSs on a same time-frequency resource, so that interference between the PTRSs transmitted or received by the plurality of terminal devices and data can be avoided. In addition, mutual interference between uplink or downlink PTRSs of different users may be reduced by scrambling a random sequence.

It should be understood that, the time domain density may be a ratio of a quantity of orthogonal frequency division multiplexing (OFDM) symbols to which a PTRS is mapped in every n OFDM symbols of the terminal device or the network device, to n symbols. Alternatively, the time domain density may be a ratio of a quantity of discrete Fourier transform spread orthogonal frequency division multiplexing (DFT-s-OFDM) symbols to which a PTRS is mapped in every m DFT-s-OFDM symbols, to m DFT-s-OFDM symbols. Alternatively, the time domain density may be a ratio of a quantity of sampling points to which a PTRS is mapped or a quantity of PTRS blocks in every p sampling points, to p sampling points. The frequency domain density may be a ratio of a quantity of subcarriers to which a PTRS is mapped in every q subcarriers, to q subcarriers. Alternatively, the frequency domain density may be represented by a ratio of a quantity r of subcarriers to which a PTRS is mapped in every k resource blocks (RBs), to k RBs. In this case, the frequency domain density may be represented by r/k, where m, n, p, q, r, and k are integers greater than or equal to 1.

It should be understood that, with respect to the time domain density and the frequency domain density mentioned in this embodiment of this application, a time domain density 1/n of PTRSs in cyclic prefix orthogonal frequency division multiplexing (CP-OFDM) specifically means that a PTRS is mapped to one CP-OFDM symbol in every n CP-OFDM symbols, and a time domain density 1/n of PTRSs on a symbol level in DFT-s-OFDM specifically means that a PTRS is mapped to one DFT-s-OFDM symbol in every n DFT-s-OFDM symbols. A frequency domain density 1/n of PTRSs in CP-OFDM specifically means that a PTRS is mapped to one subcarrier in every n RBs. A time domain density 1/n of PTRSs on a sampling point level in DFT-s-OFDM specifically means that one PTRS block exists in every n sampling points.

In some implementations, before the transmitting, by a network device, first indication information to a terminal device, the method further includes: transmitting, by the network device, second indication information to the terminal device, where the second indication information is used to indicate a time domain density subset and/or a frequency domain density subset used for transmitting the PTRS by the terminal device or the network device.

Optionally, the time domain density subset used for transmitting the PTRS by the terminal device or the network device may also be a time domain density subset specified by the protocol, and the frequency domain density subset used for transmitting the PTRS by the terminal device or the network device may also be a frequency domain density subset specified by the protocol.

In some implementations, the transmitting, by the network device, second indication information to the terminal device includes: transmitting, by the network device, the second indication information to the terminal device by using RRC signaling.

Optionally, the transmitting, by the network device, second indication information to the terminal device includes: transmitting, by the network device, the second indication information to the terminal device by using system information or downlink control information (DCI).

In some implementations, before the transmitting, by a network device, first indication information to a terminal device, the method further includes: transmitting, by the network device, a first correspondence to the terminal device, where the first correspondence is used to indicate a one-to-one correspondence between a plurality of modulation and coding scheme (MCS) intervals and a plurality of time domain density subsets and/or a plurality of frequency domain density subsets. For example, the first correspondence may be a table of mappings between MCS interval ranges and time domain density subsets and/or frequency domain density subsets, the plurality of time domain density subsets include the time domain density subset used for transmitting the PTRS by the terminal device or the network device, and the plurality of frequency domain density subsets include the frequency domain density subset used for transmitting the PTRS by the terminal device or the network device.

In some implementations, the first correspondence is determined based on a second correspondence between a bandwidth (BW) and a plurality of first time domain density values and/or a plurality of first frequency domain density values, elements in the plurality of time domain density subsets are at least some of the plurality of first time domain density values, and elements in the plurality of frequency domain density subsets are at least some of the plurality of first frequency domain density values.

In some implementations, the transmitting, by the network device, a first correspondence to the terminal device includes: transmitting, by the network device, the first correspondence to the terminal device by using RRC signaling.

Optionally, the transmitting, by the network device, a first correspondence to the terminal device includes: transmitting, by the network device, the first correspondence to the terminal device by using system information or DCI.

In some implementations, before the transmitting, by a network device, first indication information to a terminal device, the method further includes: transmitting, by the network device, thresholds of the plurality of MCS intervals to the terminal device by using RRC signaling, where the plurality of MCS intervals correspond to the plurality of time domain density subsets and/or the plurality of frequency domain density subsets on a one-to-one basis.

In some implementations, the time domain density subset includes a time domain density value 0, and the frequency domain density subset includes a frequency domain density value 0. The time domain density value 0 indicates that the PTRS is muted in time domain, that is, the terminal device or the network device does not transmit the PTRS. The frequency domain density value 0 indicates that the PTRS is muted in frequency domain, that is, the terminal device or the network device does not transmit the PTRS.

In some implementations, the time domain density subset includes two optional time domain density values, and the frequency domain density subset includes two optional frequency domain density values.

In some implementations, the transmitting, by a network device, first indication information to a terminal device includes: transmitting, by the network device, the first indication information to the terminal device by using DCI.

Optionally, the transmitting, by a network device, first indication information to a terminal device includes: transmitting, by the network device, the first indication information to the terminal device by using RRC signaling or system information, for example, broadcasting the first indication information to all terminal devices in an MU-MIMO mode by using RRC signaling or system information. Therefore, all the terminal devices in the MU-MIMO mode can transmit PTRSs to the network device by using the time domain density and/or the frequency domain density.

In some implementations, the first indication information is specifically an n-bit information indication field, n is a positive integer greater than or equal to 1, a combination of 0 and 1 in the n-bit information indication field corresponds to a plurality of second time domain density values and/or corresponds to a plurality of second frequency domain density values, the plurality of second time domain density values include the time domain density, and the plurality of second frequency domain density values include the frequency domain density.

Optionally, the plurality of first time domain density values may be the same as or different from the plurality of second time domain density values, and the plurality of first frequency domain density values may be the same as or different from the plurality of second frequency domain density values.

Optionally, n is 1. For example, when the time domain density subset is {1, 1/2} including two elements}, and when the 1-bit information indication field is 1, the time domain density is 1 in the time domain density subset {1, 1/2}; or when the 1-bit information indication field is 0, the time domain density is 1/2 in the time domain density subset {1, 1/2}. The frequency domain density subset is similar, and is not described again to avoid repetition.

Optionally, when n is 1, and when the 1-bit information indication field is 1, it may indicate a greatest time domain density in the time domain density subset, for example, 1 in {1, 1/2}; or when the 1-bit information indication field is 0, it may indicate a smallest time domain density in the time domain density subset, for example, 1/2 in the density subset {1, 1/2}. When the 1-bit information indication field is 1, it may indicate a smallest time domain density in the time domain density subset, for example, 1/2 in {1, 1/2}; or when the 1-bit information indication field is 0, it may indicate a greatest time domain density in the time domain density subset, for example, 1 in the density subset {1, 1/2}. This is not limited in this embodiment of this application. The frequency domain density subset is similar, and is not described again to avoid repetition. It should be understood that, the time domain density 1/2 indicates that a PTRS is mapped to one of every two symbols.

Optionally, n is 2. For example, if the information indication field corresponding to the first indication information is 00, it indicates that the time domain density value is 0; if the information indication field corresponding to the first indication information is 01, it indicates that the time domain density value is 1/4; if the information indication field corresponding to the first indication information is 10, it indicates that the time domain density value is 1/2; or if the information indication field corresponding to the first indication information is 11, it indicates that the time domain density value is 1. A manner of indicating the frequency domain density is similar, and is not described again to avoid repetition.

In some implementations, after the transmitting, by a network device, first indication information to a terminal device, the method further includes: receiving, by the network device, the PTRS transmitted by the terminal device based on the first indication information.

In some implementations, after the transmitting, by a network device, first indication information to a terminal device, the method further includes: transmitting, by the network device, the PTRS to the terminal device based on the first indication information.

In some implementations, the method is applied to a DFT-s-OFDM waveform or applied to a CP-OFDM waveform.

According to a second aspect, a reference signal indication method is provided and includes: receiving, by a terminal device, first indication information transmitted by a network device, where the first indication information is used to indicate a time domain density and/or a frequency domain density for transmitting a PTRS by the terminal device or the network device; and determining, by the terminal device based on the first indication information, the time domain density and/or the frequency domain density for transmitting the PTRS by the terminal device or the network device.

In some implementations, the determining, by the terminal device based on the first indication information, the time domain density and/or the frequency domain density for transmitting the PTRS by the terminal device or the network device includes: determining, by the terminal device based on the first indication information, the time domain density in a time domain density subset used by the terminal device or the network device; and/or determining, by the terminal device based on the first indication information, the frequency domain density in a frequency domain density subset used by the terminal device or the network device.

In some implementations, before the determining, by the terminal device based on the first indication information, the time domain density in a time domain density subset used by the terminal device or the network device, and/or before the determining, by the terminal device based on the first indication information, the frequency domain density in a frequency domain density subset used by the terminal device or the network device, the method further includes:

receiving, by the terminal device, second indication information transmitted by the network device, where the second indication information is used to indicate the time domain density subset and/or the frequency domain density subset used for transmitting the PTRS by the terminal device or the network device;

the determining, by the terminal device based on the first indication information, the time domain density in a time domain density subset used by the terminal device or the network device includes: determining, by the terminal device based on the second indication information, the time domain density subset used for transmitting the PTRS by the terminal device or the network device; and determining, by the terminal device in the time domain density subset based on the time domain density used for transmitting the PTRS by the terminal device or the network device and indicated by the first indication information, the time domain density for transmitting the PTRS by the terminal device or the network device; for example, the terminal device may select, based on the indication of the first indication information, an element from the time domain density subset used by the terminal device or the network device, as the time domain density; and the determining, by the terminal device based on the first indication information, the frequency domain density in a frequency domain density subset used by the terminal device or the network device includes: determining, by the terminal device based on the second indication information, the frequency domain density subset used for transmitting the PTRS by the terminal device or the network device; and determining, by the terminal device in the frequency domain density subset based on the frequency domain density used for transmitting the PTRS by the terminal device or the network device and indicated by the first indication information, the frequency domain density for transmitting the PTRS by the terminal device or the network device; for example, the terminal device may select, based on the indication of the first indication information, an element from the frequency domain density subset used by the terminal device or the network device, as the frequency domain density.

In some implementations, the receiving, by the terminal device, second indication information transmitted by the network device includes: receiving, by the terminal device, the second indication information transmitted by the network device by using RRC signaling.

Optionally, the receiving, by the terminal device, second indication information transmitted by the network device includes: receiving, by the terminal device, the second indication information transmitted by the network device by using system information or DCI.

In some implementations, before the receiving, by a terminal device, first indication information transmitted by a network device, the method further includes: receiving, by the terminal device, a first correspondence transmitted by the network device, where the first correspondence is used to indicate a one-to-one correspondence between a plurality of MCS intervals and a plurality of time domain density subsets and/or a plurality of frequency domain density subsets;

the determining, by the terminal device based on the second indication information, the time domain density subset used for transmitting the PTRS by the terminal device or the network device includes: determining, by the terminal device based on the first correspondence, the plurality of time domain density subsets corresponding to the plurality of MCS intervals; and determining, by the terminal device in the plurality of time domain density subsets based on the time domain density subset used for transmitting the PTRS by the terminal device or the network device and indicated by the second indication information, the time domain density subset used for transmitting the PTRS by the terminal device or the network device; and/or the determining, by the terminal device based on the second indication information, the frequency domain density subset used for transmitting the PTRS by the terminal device or the network device includes: determining, by the terminal device based on the first correspondence, the plurality of frequency domain density subsets corresponding to the plurality of MCS intervals; and determining, by the terminal device in the plurality of frequency domain density subsets based on the frequency domain density subset used for transmitting the PTRS by the terminal device or the network device and indicated by the second indication information, the frequency domain density subset used for transmitting the PTRS by the terminal device or the network device.

In some implementations, the receiving, by the terminal device, a first correspondence transmitted by the network device includes: receiving, by the terminal device, the first correspondence transmitted by the network device by using RRC signaling.

Optionally, the receiving, by the terminal device, a first correspondence transmitted by the network device includes: receiving, by the terminal device, the first correspondence transmitted by the network device by using system information or DCI.

In some implementations, before the receiving, by a terminal device, first indication information transmitted by a network device, the method further includes: receiving, by the terminal device, thresholds of the plurality of MCS intervals transmitted by the network device by using RRC signaling, where the plurality of MCS intervals correspond to the plurality of time domain density subsets and/or the plurality of frequency domain density subsets on a one-to-one basis; and the determining, by the terminal device based on the second indication information, the time domain density subset used for transmitting the PTRS by the terminal device or the network device includes: determining, by the terminal device based on the thresholds of the plurality of MCS intervals, the plurality of time domain density subsets corresponding to the plurality of MCS intervals; and determining, by the terminal device in the plurality of time domain density subsets based on the time domain density subset used for transmitting the PTRS by the terminal device or the network device and indicated by the second indication information, the time domain density subset used for transmitting the PTRS by the terminal device or the network device; it should be understood that, herein the second indication information may be an MCS value.

In some implementations, the determining, by the terminal device based on the second indication information, the frequency domain density subset used for transmitting the PTRS by the terminal device or the network device includes: determining, by the terminal device based on the thresholds of the plurality of MCS intervals, the plurality of frequency domain density subsets corresponding to the plurality of MCS intervals; and determining, by the terminal device in the plurality of frequency domain density subsets based on the frequency domain density subset used for transmitting the PTRS by the terminal device or the network device and indicated by the second indication information, the frequency domain density subset used for transmitting the PTRS by the terminal device or the network device; it should be understood that, herein the second indication information may be an MCS value.

In some implementations, the time domain density subset includes a time domain density value 0, and the frequency domain density subset includes a frequency domain density value 0.

In some implementations, the time domain density subset includes two optional density values, and the frequency domain density subset includes two optional density values.

In some implementations, the receiving, by a terminal device, first indication information transmitted by a network device includes: receiving, by the terminal device, the first indication information transmitted by the network device by using DCI.

Optionally, the terminal device receives the first indication information transmitted by the network device by using system information or RRC signaling.

In some implementations, the first indication information is specifically an n-bit information indication field, n is a positive integer greater than or equal to 1, a combination of 0 and 1 in the n-bit information indication field corresponds to a plurality of second time domain density values and/or corresponds to a plurality of second frequency domain density values, the plurality of second time domain density values include the time domain density, and the plurality of second frequency domain density values include the frequency domain density.

In some implementations, after the determining, by the terminal device based on the first indication information, the time domain density and/or the frequency domain density for transmitting the PTRS by the terminal device or the network device, the method further includes: transmitting, by the terminal device, the PTRS to the network device based on the time domain density and/or the frequency domain density.

In some implementations, after the determining, by the terminal device based on the first indication information, the time domain density and/or the frequency domain density for transmitting the PTRS by the network device, the method further includes: receiving, by the terminal device, the PTRS transmitted by the network device based on the time domain density and/or the frequency domain density.

In some implementations, the method is applied to a DFT-s-OFDM waveform or applied to a CP-OFDM waveform.

According to a third aspect, a reference signal indication method is provided and includes: receiving, by a network device, a PTRS transmitted by a terminal device based on a time domain density, where the time domain density is a density in a DFT-s-OFDM waveform.

Optionally, the time domain density may be specified by a protocol.

In some implementations, before the receiving, by a network device, a PTRS transmitted by a terminal device based on a time domain density, the method further includes: transmitting, by the network device, configuration information of the PTRS to the terminal device, where the configuration information of the PTRS is used to indicate the time domain density for transmitting the PTRS by the terminal device.

In some implementations, the time domain density is specifically a symbol-level time domain density for transmitting the PTRS by the terminal device.

In some implementations, the time domain density on the symbol level is associated with at least one of an MCS value and a carrier frequency (fc) value. Specifically, the time domain density on the symbol level in the DFT-s-OFDM waveform is similar to a time domain density in a CP-OFDM waveform.

In some implementations, the time domain density is specifically a time domain density on a sampling point level, for transmitting the PTRS by the terminal device.

In some implementations, the time domain density on the sampling point level is associated with at least one of a scheduled BW value, an MCS, and an fc value of the terminal device, that is, an association relationship exists.

In some implementations, the association relationship may be defined by the protocol or configured by the network device by using higher layer signaling. Optionally, the higher layer signaling may be RRC signaling or media access control (MAC) control element (CE) signaling.

According to a fourth aspect, a reference signal indication method is provided and includes: determining, by a terminal device, a time domain density for transmitting a PTRS; and transmitting, by the terminal device, the PTRS to a network device based on the time domain density, where the time domain density is a density in a DFT-s-OFDM waveform.

In some implementations, the determining, by a terminal device, a time domain density for transmitting a PTRS includes: receiving, by the terminal device, configuration information that is of the PTRS and is transmitted by the network device, where the configuration information of the PTRS is used to indicate the time domain density for transmitting the PTRS by the terminal device, and determining, by the terminal device based on the configuration information of the PTRS, the time domain density for transmitting the PTRS.

Optionally, the time domain density determined by the terminal device for transmitting the PTRS may be a time domain density specified by a protocol, for transmitting the PTRS. This is not limited in this embodiment of this application.

In some implementations, the time domain density is specifically a symbol-level time domain density for transmitting the PTRS by the terminal device; and the transmitting, by the terminal device, the PTRS to a network device based on the time domain density includes: transmitting, by the terminal device, the PTRS to the network device based on the time domain density on the symbol level.

In some implementations, the time domain density on the symbol level is associated with at least one of an MCS value and an fc value.

In some implementations, the time domain density is specifically a time domain density on a sampling point level, for transmitting the PTRS by the terminal device; and the transmitting, by the terminal device, the PTRS to a network device based on the time domain density includes: transmitting, by the terminal device, the PTRS to the network device based on the time domain density on the sampling point level.

In some implementations, the time domain density on the sampling point level is associated with at least one of a scheduled BW value, an MCS, and an fc value of the terminal device, that is, an association relationship exists.

In some implementations, the association relationship may be defined by the protocol or configured by the network device by using higher layer signaling. Optionally, the higher layer signaling may be RRC signaling or MAC CE signaling.

According to a fifth aspect, a reference signal indication method is provided and includes: transmitting, by a network device, density switch information to a terminal device, where the density switch information is used to indicate that the terminal device or the network device is to switch between a first density mode and a second density mode, the first density mode is a highest time domain density used for transmitting a PTRS by the terminal device or the network device, and/or a highest frequency domain density used for transmitting a PTRS by the terminal device or the network device, the second density mode is a time domain density and/or a frequency domain density used for transmitting a PTRS by the terminal device or the network device and determined by the terminal device based on a correspondence, and the correspondence is used to indicate a correspondence between a transmission parameter and at least one time domain density value, and/or at least one frequency domain density value.

In this embodiment of this application, the network device may indicate, by using the density switch information, a density mode used by the terminal device. Different density modes may be used in different scenarios, and further, system flexibility can be improved.

In some implementations, the transmitting, by a network device, density switch information to a terminal device includes: transmitting, by the network device, the density switch information to the terminal device by using DCI.

In some implementations, the density switch information is specifically used to indicate that the terminal device or the network device is currently in a first operation mode or a second operation mode, where the first operation mode is that the terminal device or the network device is in an MU-MIMO mode, the second operation mode is that the terminal device or the network device is in a single-user multiple-input multiple-output (SU-MIMO) mode, the first operation mode corresponds to the first density mode, and the second operation mode corresponds to the second density mode.

In some implementations, the density switch information is specifically a 1-bit information indication field; and when the 1-bit information indication field is 1, the density switch information is used to indicate that the terminal device or the network device is currently in the first operation mode; or when the 1-bit information indication field is 0, the density switch information is used to indicate that the terminal device or the network device is currently in the second operation mode. Alternatively, when the 1-bit information indication field is 1, the density switch information is used to indicate that the terminal device or the network device is currently in the second operation mode; or when the 1-bit information indication field is 0, the density switch information is used to indicate that the terminal device or the network device is currently in the first operation mode.

In some implementations, the transmission parameter includes at least one of an MCS, a quantity of RBs, a subcarrier spacing, and a signal to interference plus noise ratio (SINR).

In some implementations, after the transmitting, by a network device, density switch information to a terminal device, the method further includes: receiving, by the network device, the PTRS transmitted by the terminal device based on the density switch information.

In some implementations, after the transmitting, by a network device, density switch information to a terminal device, the method further includes: transmitting, by the network device, the PTRS to the terminal device based on the density switch information.

In some implementations, the method is applied to a DFT-s-OFDM waveform or applied to a CP-OFDM waveform.

According to a sixth aspect, a reference signal indication method is provided and includes: receiving, by a terminal device, density switch information transmitted by a network device, where the density switch information is used to indicate that the terminal device or the network device is to switch between a first density mode and a second density mode, the first density mode is a highest time domain density used for transmitting a PTRS by the terminal device or the network device, and/or a highest frequency domain density used for transmitting a PTRS by the terminal device or the network device, the second density mode is a time domain density and/or a frequency domain density used for transmitting a PTRS by the terminal device or the network device and determined by the terminal device based on a correspondence, and the correspondence is used to indicate a correspondence between a transmission parameter and at least one time domain density value, and/or at least one frequency domain density value; determining, by the terminal device based on the density switch information, a target density mode used for transmitting the PTRS by the terminal device or the network device, where the target density mode is the first density mode or the second density mode; and determining, by the terminal device based on the target density mode, the time domain density and/or the frequency domain density for transmitting the PTRS by the terminal device or the network device.

In some implementations, the receiving, by a terminal device, density switch information transmitted by a network device includes: receiving, by the terminal device, the density switch information transmitted by the network device by using DCI.

In some implementations, the density switch information is specifically used to indicate that the terminal device or the network device is currently in a first operation mode or a second operation mode, where the first operation mode is that the terminal device or the network device is in an MU-MIMO mode, the second operation mode is that the terminal device or the network device is in an SU-MIMO mode, the plurality of terminal devices include the terminal device, the first operation mode corresponds to the first density mode, and the second operation mode corresponds to the second density mode.

In some implementations, the density switch information is specifically a 1-bit information indication field; and when the 1-bit information indication field is 1, the density switch information is used to indicate that the terminal device or the network device is currently in the first operation mode; or when the 1-bit information indication field is 0, the density switch information is used to indicate that the terminal device or the network device is currently in the second operation mode. Alternatively, when the 1-bit information indication field is 1, the density switch information is used to indicate that the terminal device or the network device is currently in the second operation mode; or when the 1-bit information indication field is 0, the density switch information is used to indicate that the terminal device or the network device is currently in the first operation mode.

In some implementations, the transmission parameter includes at least one of an MCS, a quantity of RBs, a subcarrier spacing, and an SINR.

In some implementations, after the receiving, by a terminal device, density switch information transmitted by a network device, the method further includes: transmitting, by the terminal device, the PTRS to the network device based on the time domain density and/or the frequency domain density.

In some implementations, after the receiving, by a terminal device, density switch information transmitted by a network device, the method further includes: receiving, by the terminal device, the PTRS transmitted by the network device based on the density switch information.

In some implementations, the method is applied to a DFT-s-OFDM waveform or applied to a CP-OFDM waveform.

According to a seventh aspect, a reference signal indication method is provided and includes: transmitting, by a network device, first configuration information to a first terminal device, where the first configuration information is used to indicate that the first terminal device or the network device is to transmit a zero-power PTRS (ZP-PTRS) on a time domain resource and/or a frequency domain resource; and receiving, by the network device, the ZP-PTRS transmitted by the first terminal device based on the first configuration information.

In this embodiment of this application, transmitting the ZP-PTRS by the first terminal device based on the first configuration information is equivalent to transmitting no data. Therefore, the first terminal device does not cause interference to data transmitted by another terminal device on the time domain resource or the frequency domain resource.

Optionally, the time domain resource and the frequency domain resource may be preset resources, may be resources notified by using a master information block (MIB) or a system information block (SIB), or may be resources configured by using RRC signaling, or resources that the terminal device may determine based on a cell identity of the terminal device. This is not limited in this embodiment of this application.

In some implementations, the network device transmits second configuration information to a second terminal device, where the second configuration information is used to indicate that the second terminal device or the network device is to transmit a non-zero-power PTRS (NZP-PTRS) on the time domain resource and/or the frequency domain resource.

In some implementations, that the network device transmits second configuration information to a second terminal device includes: the network device transmits the second configuration information to the second terminal device by using DCI.

In some implementations, the transmitting, by a network device, first configuration information to a first terminal device includes: transmitting, by the network device, the first configuration information to the first terminal device by using DCI.

In some implementations, the method is applied to a DFT-s-OFDM waveform or applied to a CP-OFDM waveform.

According to an eighth aspect, a reference signal indication method is provided and includes: receiving, by a first terminal device, first configuration information transmitted by a network device, where the first configuration information is used to indicate that the first terminal device or the network device is to transmit a ZP-PTRS on a time domain resource and/or a frequency domain resource; and transmitting, by the first terminal device, the ZP-PTRS to the network device based on the first configuration information, or receiving, by the first terminal device, the ZP-PTRS transmitted by the network device based on the first configuration information.

In some implementations, a second terminal device receives second configuration information transmitted by the network device, where the second configuration information is used to indicate that the second terminal device is to transmit an NZP-PTRS on the time domain resource and/or the frequency domain resource.

In some implementations, the second terminal device transmits the NZP-PTRS on the time domain resource and/or the frequency domain resource to the network device based on the second configuration information.

In some implementations, that a second terminal device receives second configuration information transmitted by the network device includes: the second terminal device receives the second configuration information transmitted by the network device by using DCI.

Optionally, the first terminal device and the second terminal device are terminal devices in an MU-MIMO mode.

In some implementations, the receiving, by a first terminal device, first configuration information transmitted by a network device includes: receiving, by the first terminal device, the first configuration information transmitted by the network device by using DCI.

In some implementations, the method is applied to a DFT-s-OFDM waveform or applied to a CP-OFDM waveform.

According to a ninth aspect, a reference signal indication method is provided and includes: transmitting, by a network device, third indication information to a terminal device, where the third indication information is used to indicate a time domain density subset and/or a frequency domain density subset used for transmitting a PTRS by the terminal device or the network device.

In this embodiment of this application, the terminal device may determine, based on the third indication information, the time domain density subset and/or the frequency domain density subset used for transmitting the PTRS by the terminal device or the network device. To be specific, the third indication information may be used for narrowing a range of time domain densities and/or frequency domain densities that can be selected, and then a time domain density may be further determined in the time domain density subset, and a frequency domain density may be determined in the frequency domain density subset. This can improve efficiency of determining the time domain density and/or the frequency domain density.

In some implementations, before the transmitting, by a network device, third indication information to a terminal device, the method further includes: transmitting, by the network device, fourth indication information to the terminal device, where the fourth indication information is used to indicate that a plurality of MCS intervals correspond to a plurality of time domain density subsets and/or a plurality of frequency domain density subsets on a one-to-one basis.

In some implementations, the transmitting, by the network device, fourth indication information to the terminal device includes: transmitting, by the network device, the fourth indication information to the terminal device by using RRC signaling.

In some implementations, the time domain density subset includes a time domain density value 0, and/or the frequency domain density subset includes a frequency domain density value 0.

In some implementations, the transmitting, by a network device, third indication information to a terminal device includes: transmitting, by the network device, the third indication information to the terminal device by using DCI.

In some implementations, the time domain density subset includes two optional time domain density values, and the frequency domain density subset includes two optional frequency domain density values.

In some implementations, the method is applied to a DFT-s-OFDM waveform or applied to a CP-OFDM waveform.

According to a tenth aspect, a reference signal indication method is provided and includes: receiving, by a terminal device, third indication information transmitted by a network device, where the third indication information is used to indicate a time domain density subset and/or a frequency domain density subset used for transmitting a PTRS by the terminal device or the network device; and determining, by the terminal device based on the third indication information, the time domain density subset and/or the frequency domain density subset used for transmitting the PTRS by the terminal device or the network device.

In some implementations, before the receiving, by a terminal device, third indication information transmitted by a network device, the method further includes: receiving, by the terminal device, fourth indication information transmitted by the network device, where the fourth indication information is used to indicate that a plurality of MCS intervals correspond to a plurality of time domain density subsets and/or a plurality of frequency domain density subsets on a one-to-one basis; and the determining, by the terminal device based on the third indication information, the time domain density subset and/or the frequency domain density subset used for transmitting the PTRS by the terminal device or the network device includes: determining, by the terminal device, the plurality of time domain density subsets based on the fourth indication information; and determining, by the terminal device, a time domain density in the plurality of time domain density subsets based on the third indication information; and/or determining, by the terminal device, the plurality of frequency domain density subsets based on the fourth indication information; and determining, by the terminal device, a frequency domain density in the plurality of frequency domain density subsets.

In some implementations, the receiving, by the terminal device, fourth indication information transmitted by the network device includes: receiving, by the terminal device, the fourth indication information transmitted by the network device by using RRC signaling.

In some implementations, the time domain density subset includes a time domain density value 0, and/or the frequency domain density subset includes a frequency domain density value 0.

In some implementations, the receiving, by a terminal device, third indication information transmitted by a network device includes: receiving, by the terminal device, the third indication information transmitted by the network device by using DCI.

In some implementations, the time domain density subset includes two optional time domain density values, and the frequency domain density subset includes two optional frequency domain density values.

According to an eleventh aspect, a reference signal indication apparatus is provided and configured to perform the method in the first aspect or any possible implementation of the first aspect. Specifically, the apparatus includes a unit configured to perform the method in the first aspect or any possible implementation of the first aspect.

According to a twelfth aspect, a reference signal indication apparatus is provided and configured to perform the method in the second aspect or any possible implementation of the second aspect. Specifically, the apparatus includes a unit configured to perform the method in the second aspect or any possible implementation of the second aspect.

According to a thirteenth aspect, a reference signal indication system is provided and includes the apparatus in the eleventh aspect or any possible implementation of the eleventh aspect and the apparatus in the twelfth aspect or any possible implementation of the twelfth aspect.

According to a fourteenth aspect, a reference signal indication apparatus is provided and configured to perform the method in the third aspect or any possible implementation of the third aspect. Specifically, the apparatus includes a unit configured to perform the method in the third aspect or any possible implementation of the third aspect.

According to a fifteenth aspect, a reference signal indication apparatus is provided and configured to perform the method in the fourth aspect or any possible implementation of the fourth aspect. Specifically, the apparatus includes a unit configured to perform the method in the fourth aspect or any possible implementation of the fourth aspect.

According to a sixteenth aspect, a reference signal indication system is provided and includes the apparatus in the fourteenth aspect or any possible implementation of the fourteenth aspect and the apparatus in the fifteenth aspect or any possible implementation of the fifteenth aspect.

According to a seventeenth aspect, a reference signal indication apparatus is provided and configured to perform the method in the fifth aspect or any possible implementation of the fifth aspect. Specifically, the apparatus includes a unit configured to perform the method in the fifth aspect or any possible implementation of the fifth aspect.

According to an eighteenth aspect, a reference signal indication apparatus is provided and configured to perform the method in the sixth aspect or any possible implementation of the sixth aspect. Specifically, the apparatus includes a unit configured to perform the method in the sixth aspect or any possible implementation of the sixth aspect.

According to a nineteenth aspect, a reference signal indication system is provided and includes the apparatus in the seventeenth aspect or any possible implementation of the seventeenth aspect and the apparatus in the eighteenth aspect or any possible implementation of the eighteenth aspect.

According to a twentieth aspect, a reference signal indication apparatus is provided and configured to perform the method in the seventh aspect or any possible implementation of the seventh aspect. Specifically, the apparatus includes a unit configured to perform the method in the seventh aspect or any possible implementation of the seventh aspect.

According to a twenty-first aspect, a reference signal indication apparatus is provided and configured to perform the method in the eighth aspect or any possible implementation of the eighth aspect. Specifically, the apparatus includes a unit configured to perform the method in the eighth aspect or any possible implementation of the eighth aspect.

According to a twenty-second aspect, a reference signal indication system is provided and includes the apparatus in the twentieth aspect or any possible implementation of the twentieth aspect and the apparatus in the twenty-first aspect or any possible implementation of the twenty-first aspect.

According to a twenty-third aspect, a reference signal indication apparatus is provided and configured to perform the method in the ninth aspect or any possible implementation of the ninth aspect. Specifically, the apparatus includes a unit configured to perform the method in the ninth aspect or any possible implementation of the ninth aspect.

According to a twenty-fourth aspect, a reference signal indication apparatus is provided and configured to perform the method in the tenth aspect or any possible implementation of the tenth aspect. Specifically, the apparatus includes a unit configured to perform the method in the tenth aspect or any possible implementation of the tenth aspect.

According to a twenty-fifth aspect, a reference signal indication system is provided and includes the apparatus in the twenty-third aspect or any possible implementation of the twenty-third aspect and the apparatus in the twenty-fourth aspect or any possible implementation of the twenty-fourth aspect.

According to a twenty-sixth aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the first aspect or any possible implementation of the first aspect.

According to a twenty-seventh aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the second aspect or any possible implementation of the second aspect.

According to a twenty-eighth aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the third aspect or any possible implementation of the third aspect.

According to a twenty-ninth aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the fourth aspect or any possible implementation of the fourth aspect.

According to a thirtieth aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the fifth aspect or any possible implementation of the fifth aspect.

According to a thirty-first aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the sixth aspect or any possible implementation of the sixth aspect.

According to a thirty-second aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the seventh aspect or any possible implementation of the seventh aspect.

According to a thirty-third aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the eighth aspect or any possible implementation of the eighth aspect.

According to a thirty-fourth aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the ninth aspect or any possible implementation of the ninth aspect.

According to a thirty-fifth aspect, a reference signal indication apparatus is provided, and the apparatus includes a transceiver, a memory, and a processor. The transceiver, the memory, and the processor communicate with each other by using an internal connection path; the memory is configured to store an instruction; the processor is configured to execute the instruction stored in the memory, to control a receiver to receive a signal and control a transmitter to transmit a signal; and when the processor executes the instruction stored in the memory, the processor is enabled to perform the method in the tenth or any possible implementation of the tenth aspect.

According to a thirty-sixth aspect, a computer-readable storage medium is provided, where the computer-readable storage medium stores an instruction, and when the instruction is run on a computer, the computer is enabled to perform the method in the first aspect or any possible implementation of the first aspect.

According to a thirty-seventh aspect, a computer-readable storage medium is provided, where the computer-readable storage medium stores an instruction, and when the instruction is run on a computer, the computer is enabled to perform the method in the second aspect or any possible implementation of the second aspect.

According to a thirty-eighth aspect, a computer-readable storage medium is provided, where the computer-readable storage medium stores an instruction, and when the instruction is run on a computer, the computer is enabled to perform the method in the third aspect or any possible implementation of the third aspect.

According to a thirty-ninth aspect, a computer-readable storage medium is provided, where the computer-readable storage medium stores an instruction, and when the instruction is run on a computer, the computer is enabled to perform the method in the fourth aspect or any possible implementation of the fourth aspect.

According to a fortieth aspect, a computer-readable storage medium is provided, where the computer-readable storage medium stores an instruction, and when the instruction is run on a computer, the computer is enabled to perform the method in the fifth aspect or any possible implementation of the fifth aspect.

According to a forty-first aspect, a computer-readable storage medium is provided, where the computer-readable storage medium stores an instruction, and when the instruction is run on a computer, the computer is enabled to perform the method in the sixth aspect or any possible implementation of the sixth aspect.

According to a forty-second aspect, a computer-readable storage medium is provided, where the computer-readable storage medium stores an instruction, and when the instruction is run on a computer, the computer is enabled to perform the method in the seventh aspect or any possible implementation of the seventh aspect.

According to a forty-third aspect, a computer-readable storage medium is provided, where the computer-readable storage medium stores an instruction, and when the instruction is run on a computer, the computer is enabled to perform the method in the eighth aspect or any possible implementation of the eighth aspect.

According to a forty-fourth aspect, a computer-readable storage medium is provided, where the computer-readable storage medium stores an instruction, and when the instruction is run on a computer, the computer is enabled to perform the method in the ninth aspect or any possible implementation of the ninth aspect.

According to a forty-fifth aspect, a computer-readable storage medium is provided, where the computer-readable storage medium stores an instruction, and when the instruction is run on a computer, the computer is enabled to perform the method in the tenth aspect or any possible implementation of the tenth aspect.

According to a forty-sixth aspect, a communications chip is provided, where the communications chip stores an instruction, and when the instruction is run on a network device or a terminal device, the communications chip is enabled to perform the method in any one of the first aspect to the tenth aspect.

DESCRIPTION OF EMBODIMENTS

The following describes technical solutions of this application with reference to accompanying drawings.

It should be understood that, the technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a wireless local area network (WLAN), or a future fifth generation (5G) wireless communications system.

Figure 1:
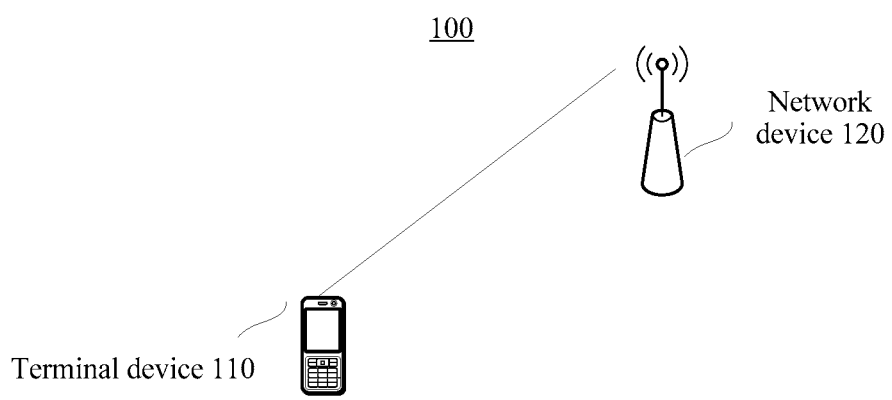
FIG. 1 is a schematic diagram of a communications system according to an embodiment of this application.

FIG. 1 is a schematic diagram of a communications system 100 according to an embodiment of this application.

A terminal device 110 may be referred to as an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, or the like.

A network device 120 may be a network-side device performing wireless communication with the terminal device, for example, a wireless fidelity (Wi-Fi) access point or a next-generation communications base station, for example, a 5G gNodeB (gNB), a small cell, a micro cell, or a transmission reception point (TRP), or may be a relay station, an access point, an in-vehicle device, a wearable device, or the like.

However, when the network device communicates with the terminal device, because a local oscillator is non-ideal, a random jitter of the local oscillator causes phase noise in an output carrier signal. A direct relationship exists between a value of phase noise and an fc. For example, the phase noise changes based on 20 log(n), where n denotes times by which the frequency increases, that is, power of the phase noise increases by 6 decibels (dB) every time the fc is doubled. Therefore, how to reduce adverse impact of the phase noise is a key point researched in the communications field. The adverse impact of the phase noise on OFDM mainly includes two parts: a common phase error (CPE) and inter-carrier interference (ICI). In a design of a system, when a subcarrier spacing is greater than 15 kilohertz (kHz), adverse impact of ICI on the system may be ignored. For CPE estimation, a transmit end estimates phase noise by inserting a PTRS into a signal of the transmit end, and therefore may compensate for a CPE caused by the phase noise. Specifically, sensitivity to phase noise varies in different transmission scenarios. Therefore, there are also different requirements on a time domain density and/or a frequency domain density of PTRSs. For example, a higher order of an MCS, a higher scheduled BW, and higher sensitivity to the phase noise require that the time domain density of PTRSs should also be higher. To reduce overheads and avoid transmission of an excessively-high density PTRS in a scenario of a low MCS and a low BW, a time-frequency density of PTRSs may be generally configured based on a transmission scenario and a transmission parameter. A method for configuring a time-frequency density of PTRSs affects a policy for multiplexing PTRSs of different terminal devices in an MU-MIMO scenario. A PTRS indication method provided by an embodiment of this application helps effectively multiplex PTRSs of different terminal devices in the MU-MIMO scenario. Specifically, this embodiment of this application mainly resolves how a transmit end transmits a PTRS, for example, which time domain density and/or frequency domain density are/is used by the transmit end to transmit the PTRS to ensure accuracy of phase noise estimation while avoiding resource waste; for another example, which time domain density and/or frequency domain density are/is used by the terminal device to transmit the PTRS to avoid interference between ports for transmitting PTRSs by a plurality of terminal devices and between a port for transmitting a PTRS and a port for transmitting data, so that a receive end can estimate and compensate for phase noise based on the received PTRS while correctness of data transmission is ensured; for another example, in a CP-OFDM waveform or a DFT-s-OFDM waveform, which time domain density and/or frequency domain density are/is used by the transmit end to transmit the PTRS.

Figure 2:
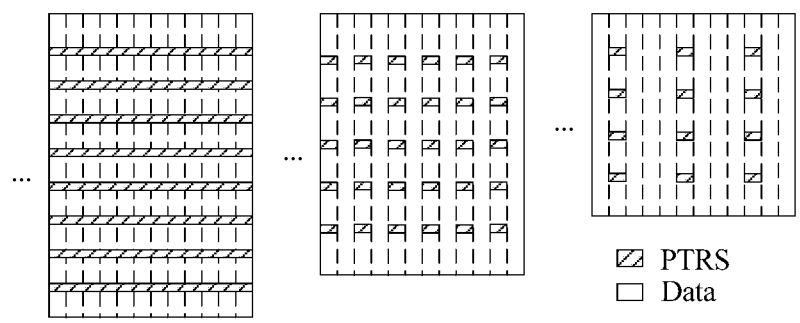
FIG. 2 is a schematic distribution diagram of a time domain density of PTRSs.
Figure 3:
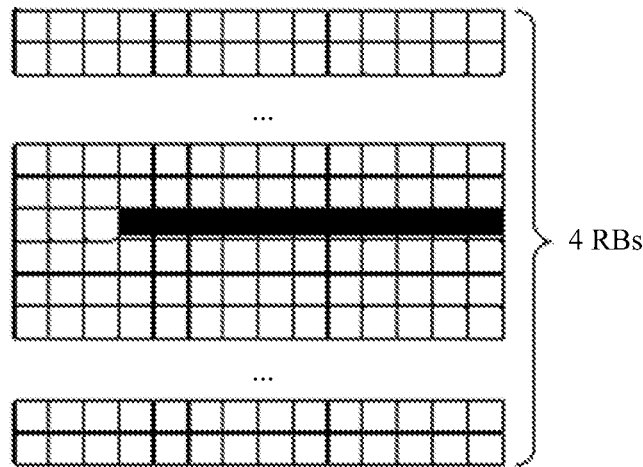
FIG. 3 is a schematic distribution diagram of a frequency domain density of PTRSs.

It should be understood that, in this embodiment of this application, the time domain density may be a ratio of a quantity of OFDM symbols to which a PTRS is mapped in every n OFDM symbols of the terminal device or a network device, to n symbols. Alternatively, the time domain density may be a ratio of a quantity of DFT-s-OFDM symbols to which a PTRS is mapped in every m DFT-s-OFDM symbols, to m DFT-s-OFDM symbols. Alternatively, the time domain density may be a ratio of a quantity of sampling points to which a PTRS is mapped in every p sampling points, to p sampling points. The frequency domain density may be a ratio of a quantity of subcarriers to which a PTRS is mapped in every q subcarriers, to q subcarriers. Alternatively, the frequency domain density may be represented by a ratio of a quantity r of subcarriers to which a PTRS is mapped in every k RBs, to k RBs. In this case, the frequency domain density may be represented by r/k, where m, n, p, q, r, and k are integers greater than or equal to 1. For example, time domain densities 1, 1/2, and 1/4 are respectively shown from left to right in FIG. 2. To be specific, 1 indicates that a PTRS is mapped to each time-domain OFDM symbol, 1/2 indicates that a PTRS is mapped to one of every two OFDM symbols, and 1/4 indicates that a PTRS is mapped to one of every four OFDM symbols. For another example, as shown in FIG. 3, a PTRS is mapped to one subcarrier in every four RBs in frequency domain. Assuming that each RB includes 12 subcarriers, a frequency domain density shown in FIG. 3 is 1/48.

Figure 4:
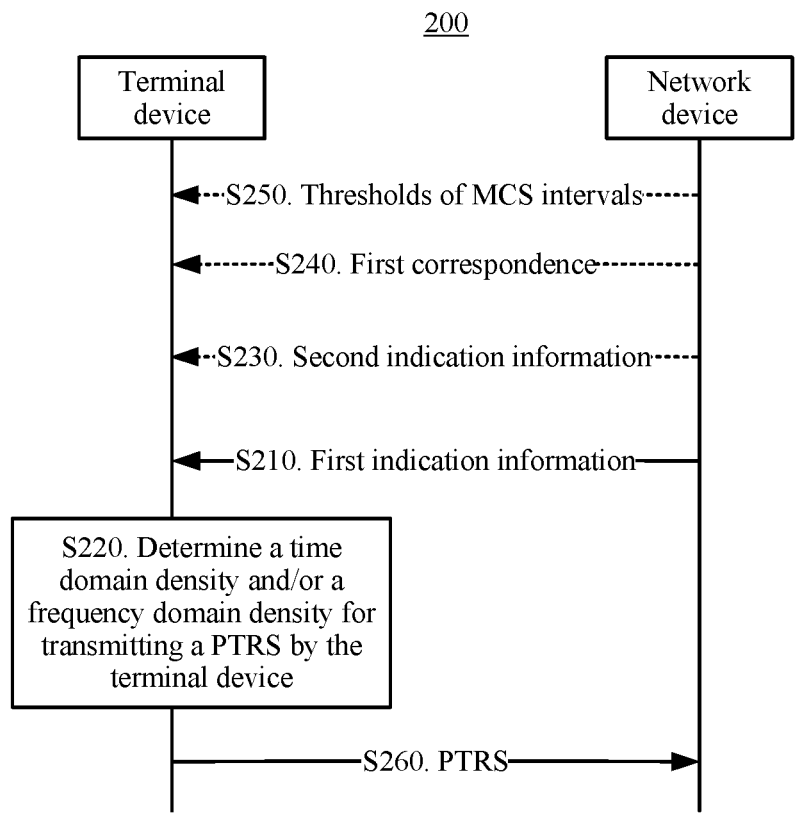
FIG. 4 is a schematic diagram of a reference signal indication method according to an embodiment of this application.

FIG. 4 shows a reference signal indication method 200 according to an embodiment of this application. The method 200 may be applied to the communications system 100 shown in FIG. 1. However, this embodiment of this application is not limited to this.

S210. A network device transmits first indication information to a terminal device, where the first indication information is used to indicate a time domain density and/or a frequency domain density for transmitting a PTRS by the terminal device.

S220. The terminal device receives the first indication information transmitted by the network device, and determines, based on the first indication information, the time domain density and/or the frequency domain density for transmitting the PTRS by the terminal device.

The terminal device determines, in the following five manners, the time domain density and/or the frequency domain density for transmitting the PTRS.

In a first manner, in S220, for example, if the first indication information indicates that a time domain density value is 1/2, the terminal device may determine that the time domain density value for transmitting the PTRS is 1/2. For another example, the first indication information may be a 1-bit information indication field, and an optional time domain density value is 1 or 1/2. When the 1-bit information indication field is 1, it indicates that the time domain density for transmitting the PTRS by the terminal device is 1; or when the 1-bit information indication field is 0, it indicates that the time domain density for transmitting the PTRS by the terminal device is 1/2. For another example, the first indication information may be a 2-bit information indication field, and optional time domain density values are {0, 1/4, 1/2, 1}. When the 2-bit information indication field is 00, it indicates that the time domain density for transmitting the PTRS by the terminal device is 0; when the 2-bit information indication field is 01, it indicates that the time domain density for transmitting the PTRS by the terminal device is 1/4; when the 2-bit information indication field is 10, it indicates that the time domain density for transmitting the PTRS by the terminal device is 1/2; or when the 2-bit information indication field is 11, it indicates that the time domain density for transmitting the PTRS by the terminal device is 1. Specifically, the first indication information indicates the frequency domain density in a similar manner. Details are not described again to avoid repetition.

In a second manner, S220 includes: the terminal device determines, based on the first indication information, the time domain density in a time domain density subset used by the terminal device; and/or the terminal device determines, based on the first indication information, the frequency domain density in a frequency domain density subset used by the terminal device. To be specific, in this embodiment of this application, based on the first indication information, the time domain density may be determined in the time domain density subset, and the frequency domain density is determined in the frequency domain density subset. The time domain density subset or the frequency domain density subset may be a subset specified by a protocol, or a subset configured by the network device. The following is used as an example for describing the time domain density subset and/or the frequency domain density subset. If the protocol specifies that the time domain density subset is {0, 1/4}, and the time domain density indicated by the first indication information is 1/4, the terminal device determines that the time domain density for transmitting the PTRS is 1/4. If the protocol specifies that the frequency domain density subset is {1/4, 1/16}, and the frequency domain density indicated by the first indication information is 1/16, the terminal device determines that the frequency domain density for transmitting the PTRS is 1/16. Certainly, the example in this embodiment of this application is merely intended for better describing the solution, and this embodiment of this application is not limited to this.

In a third manner, before S210, the method 200 further includes S230: The network device transmits second indication information to the terminal device, where the second indication information is used to indicate a time domain density subset and/or a frequency domain density subset used for transmitting the PTRS by the terminal device. The terminal device receives the second indication information. The terminal device determines, based on the second indication information, the time domain density subset used for transmitting the PTRS by the terminal device; and the terminal device determines, in the time domain density subset based on the time domain density used for transmitting the PTRS by the terminal device and indicated by the first indication information, the time domain density for transmitting the PTRS by the terminal device. For example, the terminal device may select, based on the indication of the first indication information, an element from the time domain density subset used by the terminal device, as the time domain density.

The terminal device determines, based on the second indication information, the frequency domain density subset used for transmitting the PTRS by the terminal device; and the terminal device determines, in the frequency domain density subset based on the frequency domain density used for transmitting the PTRS by the terminal device and indicated by the first indication information, the frequency domain density for transmitting the PTRS by the terminal device. To be specific, it may be understood that, the terminal device may determine the time domain density subset and/or the frequency domain density subset in a relatively narrow range based on the indication of the second indication information, and then determine, in the time domain density subset and/or the frequency domain density subset based on the indication of the first indication information, the time domain density and/or the frequency domain density for transmitting the PTRS by the terminal device. For example, the terminal device may select, based on the indication of the first indication information, an element from the frequency domain density subset used by the terminal device or the network device, as the frequency domain density.

For example, if the time domain density subset indicated by the second indication information is {0, 1/4}, and the time domain density indicated by the first indication information is 1/4, the terminal device determines that the time domain density for transmitting the PTRS is 1/4; and if the frequency domain density subset indicated by the second indication information is {0, 1/8}, and the frequency domain density indicated by the first indication information is 1/8, the terminal device determines that the frequency domain density for transmitting the PTRS is 1/8. Specifically, the terminal device transmits the PTRS on a corresponding resource based on the first indication information, where a subcarrier position and/or a symbol position to which the PTRS is mapped may be a position specified by the protocol, a position configured by using RRC signaling, a position notified by a MIB message, a position notified by a SIB message, or a position determined based on a cell ID. This is not limited in this embodiment of this application. The terminal device transmits the PTRS to the network device in the subcarrier position and/or the symbol position in the time domain density 1/4 and the frequency domain density 1/8.

In a fourth manner, before S210, the method 200 further includes S240: The network device transmits a first correspondence to the terminal device, and the terminal device receives the first correspondence transmitted by the network device. The first correspondence is used to indicate a one-to-one correspondence between a plurality of MCS intervals and a plurality of time domain density subsets and/or a plurality of frequency domain density subsets.

Optionally, the terminal device determines, based on the first correspondence, the plurality of time domain density subsets corresponding to the plurality of MCS intervals; and the terminal device determines, in the plurality of time domain density subsets based on the time domain density subset used for transmitting the PTRS by the terminal device and indicated by the second indication information, the time domain density subset used for transmitting the PTRS by the terminal device.

Optionally, the terminal device determines, based on the first correspondence, the plurality of frequency domain density subsets corresponding to the plurality of MCS intervals; and the terminal device determines, in the plurality of frequency domain density subsets based on the frequency domain density subset used for transmitting the PTRS by the terminal device and indicated by the second indication information, the frequency domain density subset used for transmitting the PTRS by the terminal device.

For example, the time domain density may be associated with a preset MCS value. A mapping between an MCS and a time domain density of PTRSs may be flexible. A table of mappings is shown as Table 1. Table 1 indicates a relationship between a time domain density of PTRSs and a preset MCS threshold. In Table 1, several MCS thresholds ($MCS_1$, $MCS_2$, $MCS_3$, and $MCS_4$) are used. The network device may flexibly configure the preset MCS thresholds. Therefore, the network device configures a correspondence between one or more time domain density values of PTRSs and an MCS. The first correspondence may be the table of mappings shown in Table 1. The plurality of MCS intervals may be [0, $MCS_1$), [$MCS_1$, $MCS_2$), [$MCS_2$, $MCS_3$) and [$MCS_3$, $MCS_4$). Specifically, four time domain density subsets shown in Table 1 include time domain density values 0, 1/4, 1/2, and 1 respectively. Alternatively, the first correspondence may be a table of mappings shown in Table 2. Table 2 is a table of mappings between MCPs and a plurality of time domain density values of PTRSs. To be specific, Table 2 is a correspondence between an MCS value and a time domain density subset. The MCS thresholds may be predefined values. The predefined values may further be updated (for example, may be configured or updated by using RRC signaling), and the plurality of MCS intervals may be [0, $MCS_1$), [$MCS_1$, $MCS_2$), and [$MCS_2$, $MCS_3$), where a time domain density subset corresponding to [0, $MCS_1$) is {0, 1/4}, a time domain density subset corresponding to [$MCS_1$, $MCS_2$) is {1/4, 1/2}, and a time domain density subset corresponding to [$MCS_2$, $MCS_3$) is {1/2, 1}. Alternatively, the first correspondence may be a table of mappings shown in Table 3. The plurality of MCS intervals may be [0, $MCS_1$), [$MCS_1$, $MCS_2$), and [$MCS_2$, $MCS_3$), where a time domain density subset corresponding to [0, $MCS_1$) is {0, 1/4}, a time domain density subset corresponding to [$MCS_1$, $MCS_2$) is {0, 1/2}, and a time domain density subset corresponding to [$MCS_2$, $MCS_3$) is {0, 1}.

TABLE 1

| MCS value | Time domain density |
|---|---|
| 0 ≤ MCS < $MCS_1$ | 0 |
| $MCS_1$ ≤ MCS < $MCS_2$ | 1/4 |
| $MCS_2$ ≤ MCS < $MCS_3$ | 1/2 |
| $MCS_3$ ≤ MCS < $MCS_4$ | 1 |

TABLE 2

| MCS value | Time domain density |
|---|---|
| 0 ≤ MCS < $MCS_1$ | {0, 1/4} |
| $MCS_1$ ≤ MCS < $MCS_2$ | {1/4, 1/2} |
| $MCS_2$ ≤ MCS < $MCS_3$ | {1/2, 1} |

TABLE 3

| MCS value | Time domain density |
|---|---|
| 0 ≤ MCS < $MCS_1$ | {0, 1/4} |
| $MCS_1$ ≤ MCS < $MCS_2$ | {0, 1/2} |
| $MCS_2$ ≤ MCS < $MCS_3$ | {0, 1} |

For another example, the first correspondence may be a table of mappings shown in Table 4. The plurality of MCS intervals may be [0, $MCS_1$), [$MCS_1$, $MCS_2$), [$MCS_2$, $MCS_3$), and [$MCS_3$, $MCS_4$). Four frequency domain density subsets shown in Table 4 include frequency domain density values 0, 1/16, 1/8, and 1/4 respectively. Specifically, the frequency domain density value 1/16 indicates that a PTRS is mapped to one of every 16 RBs, the frequency domain density value 1/8 indicates that a PTRS is mapped to one of every 8 RBs, and the frequency domain density value 1/4 indicates that a PTRS is mapped to one of every 4 RBs. Alternatively, the first correspondence may be a table of mappings shown in Table 5. The plurality of MCS intervals may be [0, $MCS_1$), [$MCS_1$, $MCS_2$), and [$MCS_2$, $MCS_3$), where a frequency domain density subset corresponding to [0, $MCS_1$) is {0, 1/16}, a frequency domain density subset corresponding to [$MCS_1$, $MCS_2$) is {1/6, 1/8}, and a frequency domain density subset corresponding to [$MCS_2$, $MCS_3$) is {1/8, 1/4}. Alternatively, the first correspondence may be a table of mappings shown in Table 6. The plurality of MCS intervals may be [0, $MCS_1$), [$MCS_1$, $MCS_2$), and [$MCS_2$, $MCS_3$), where a frequency domain density subset corresponding to [0, $MCS_1$) is {0, 1/16}, a frequency domain density subset corresponding to [$MCS_1$, $MCS_2$) is {0, 1/8}, and a frequency domain density subset corresponding to [$MCS_2$, $MCS_3$) is {0, 1/4}.

TABLE 4

| MCS value | Frequency domain density |
|---|---|
| 0 ≤ MCS < $MCS_1$ | 0 |
| $MCS_1$ ≤ MCS < $MCS_2$ | 1/16 |
| $MCS_2$ ≤ MCS < $MCS_3$ | 1/8 |
| $MCS_3$ ≤ MCS < $MCS_4$ | 1/4 |

TABLE 5

| MCS value | Frequency domain density |
|---|---|
| 0 ≤ MCS < $MCS_1$ | {0, 1/16} |
| $MCS_1$ ≤ MCS < $MCS_2$ | {1/16, 1/8} |
| $MCS_2$ ≤ MCS < $MCS_3$ | {1/8, 1/4} |

TABLE 6

| MCS value | Frequency domain density |
|---|---|
| 0 ≤ MCS < $MCS_1$ | {0, 1/16} |
| $MCS_1$ ≤ MCS < $MCS_2$ | {0, 1/8} |
| $MCS_2$ ≤ MCS < $MCS_3$ | {0, 1/4} |

For example, the following provides Table 7 of mappings between preset BWs (using a quantity $N_{RB}$ of RBs as an example) and frequency domain densities of PTRSs. Table 7 indicates a relationship between a frequency domain density of PTRSs and a preset BW threshold. The preset BW thresholds $N_{RB1}$, $N_{RB2}$, $N_{RB3}$, and $N_{RB4}$ may also be configured flexibly. The network device may configure one or more frequency domain densities for the preset BW thresholds, as shown in Table 7. Table 8 is a table of mappings between BWs and a plurality of frequency domain density values of PTRSs. To be specific, Table 8 is a correspondence between a BW and a frequency domain density subset. The preset BW values may be configured in a predefined manner, or the network device may update or configure the preset BW values by using RRC signaling, or the like. This is not limited in this embodiment of this application.

TABLE 7

| BW value | Frequency domain density |
|---|---|
| 0 ≤ $N_{RB}$ < $N_{RB1}$ | 0 |
| $N_{RB1}$ ≤ $N_{RB}$ < $N_{RB2}$ | 1/4 |

TABLE 7-continued

| BW value | Frequency domain density |
| --- | --- |
| $N_{RB2} \leq N_{RB} < N_{RB3}$ | 1/8 |
| $N_{RB3} \leq N_{RB} < N_{RB4}$ | 1/16 |
| $N_{RB4} < N_{RB}$ | 1/32 |

TABLE 8

| BW value | Frequency domain density |
| --- | --- |
| $0 \leq N_{RB} < N_{RB1}$ | {0, 1/4} |
| $N_{RB1} \leq N_{RB} < N_{RB2}$ | {1/2, 1/4} |
| $N_{RB2} \leq N_{RB} < N_{RB3}$ | {1/4, 1/2} |
| $N_{RB3} \leq N_{RB} < N_{RB4}$ | {1/8, 1/4} |
| $N_{RB4} < N_{RB}$ | {1/16, 1/8} |

For another example, the first correspondence may be a table of mappings shown in Table 9, and the plurality of MCS intervals may be [0, $MCS_1$), [$MCS_1$, $MCS_2$), and [$MCS_2$, $MCS_3$). Three time-frequency density subsets shown in Table 9 include time-frequency density values (0, 1/16), (1/4, 1/8), and (1/2, 1/4) respectively. In each time-frequency domain combination, the first element indicates a time domain density value, and the second element indicates a frequency domain density value. Alternatively, the first correspondence may be a table of mappings shown in Table 10. The plurality of MCS intervals may be [0, $MCS_1$), [$MCS_1$, $MCS_2$), and [$MCS_2$, $MCS_3$), where a time-frequency density subset corresponding to [0, $MCS_1$) is {(0, 0), (1/4, 1/16)}, a time-frequency density subset corresponding to [$MCS_1$, $MCS_2$) is {(1/4, 1/16), (1/2, 1/8)}, and a time-frequency density subset corresponding to [$MCS_2$, $MCS_3$) is {(1/2, 1/8), (1, 1/4)}. Alternatively, the first correspondence may be a table of mappings shown in Table 11. The plurality of MCS intervals may be [0, $MCS_1$), [$MCS_1$, $MCS_2$), and [$MCS_2$, $MCS_3$), where a time-frequency density subset corresponding to [0, $MCS_1$) is {(0, 0), (1/4, 1/16)}, a time-frequency density subset corresponding to [$MCS_1$, $MCS_2$) is {(0, 0), (1/2, 1/8)}, and a time-frequency density subset corresponding to [$MCS_2$, $MCS_3$) is {(0, 0), (1, 1/4)}.

TABLE 9

| MCS value | Time-frequency density |
| --- | --- |
| $0 \leq MCS < MCS_1$ | 0, 1/16 |
| $MCS_1 \leq MCS < MCS_2$ | 1/4, 1/8 |
| $MCS_2 \leq MCS < MCS_3$ | 1/2, 1/4 |

TABLE 10

| MCS value | Time-frequency density |
| --- | --- |
| $0 \leq MCS < MCS_1$ | {(0, 0), (1/4, 1/16)} |
| $MCS_1 \leq MCS < MCS_2$ | {(1/4, 1/16), (1/2, 1/8)} |
| $MCS_2 \leq MCS < MCS_3$ | {(1/2, 1/8), (1, 1/4)} |

TABLE 11

| MCS value | Time-frequency density |
| --- | --- |
| $0 \leq MCS < MCS_1$ | {(0, 0), (1/4, 1/16)} |
| $MCS_1 \leq MCS < MCS_2$ | {(0, 0), (1/2, 1/8)} |
| $MCS_2 \leq MCS < MCS_3$ | {(0, 0), (1, 1/4)} |

Specifically, based on the first correspondence, the terminal device may first determine a table of mappings, which may be, for example, similar to forms in Table 1 to Table 11. Then the terminal device may determine the time domain density subset based on the second indication information. Assuming that the second indication information is an MCS value, when the terminal device receives the MCS value transmitted by the network device, the terminal device searches the table to find the time domain density subset, and then determines, based on the time domain density value indicated by the first indication information, the time domain density for transmitting the PTRS. Assuming that the second indication information is a BW value, when the terminal device receives the BW value transmitted by the network device, the terminal device searches the table to find the frequency domain density subset corresponding to the BW value, and then determines, in the frequency domain density subset based on the indication of the first indication information, the frequency domain density for transmitting the PTRS.

Optionally, the first correspondence is determined based on a second correspondence between a BW and a plurality of first time domain density values and/or a plurality of first frequency domain density values, elements in the plurality of time domain density subsets are at least some of the plurality of first time domain density values, and elements in the plurality of frequency domain density subsets are at least some of the plurality of first frequency domain density values. For example, a specific BW corresponds to a plurality of first frequency domain density values {0, 1/16, 1/8, 1/4}. Based on the plurality of first frequency domain density values, the network device may determine a plurality of frequency domain density subsets, which may be, for example, {0, 1/16}, {1/16, 1/8}, and {1/8, 1/4}. To be specific, a correspondence between {0, 1/16, 1/8, 1/4} and {0, 1/16}, {1/16, 1/8}, and {1/8, 1/4} may be referred to as the second correspondence. The network device may determine an MCS interval corresponding to each frequency domain density subset, form the first correspondence (as shown in Table 5), and transmit the first correspondence to the terminal device. The terminal device determines the frequency domain density subset based on the second indication information, and determines, in the frequency domain density subset based on the first indication information, the frequency domain density for transmitting the PTRS. For another example, a specific BW corresponds to a plurality of first frequency domain density values {0, 1/16, 1/8, 1/4}. Based on the plurality of first frequency domain density values, the network device may determine a plurality of frequency domain density subsets, which may be, for example, {0, 1/16}, {0, 1/8}, and {0, 1/4}. To be specific, a correspondence between {0, 1/16, 1/8, 1/4} and {0, 1/16}, {0, 1/8}, and {0, 1/4} may be referred to as the second correspondence. The network device may determine an MCS interval corresponding to each frequency domain density subset, form the first correspondence (as shown in Table 6), and transmit the first correspondence to the terminal device. The terminal device determines the frequency domain density subset based on the second indication information, and determines, in the frequency domain density subset based on the first indication information, the frequency domain density for transmitting the PTRS. For example, as shown in Table 12, a frequency domain density corresponding to a specific BW interval [0, $N_{RB1}$) is 0, that is, the first row in Table 12. A column value in the first row may be found based on an MCS value. A frequency domain density range corresponding to a BW [$N_{RB1}$, $N_{RB2}$) is {1/4, 1/8, 0}, that is, the second row in Table 12. A column value in the second row may be found based on an MCS value. A frequency domain density range corresponding to [$N_{RB2}$, $N_{RB3}$) is {1/8, 1/16, 0}, that is, the third row in Table 12. A column value in the third row may be found based on an MCS value. A frequency domain density range corresponding to [$N_{RB3}$, $N_{RB4}$) is {1/16, 1/32, 0}, that is, the fourth row in Table 12. A column value in the fourth row may be found based on an MCS value, that is, the first indication information in Table 12 may be an MCS value. Similarly, a correspondence between a BW and a frequency domain subset is shown in Table 13. Details are not described again herein to avoid repetition. In Table 13, for example, the second indication information may be an MCS value, and the first indication information may be a 1-bit or 2-bit information indication field, indicating that the specific frequency domain density is a value in a frequency domain subset in Table 13. The network device configures a frequency domain density value, a BW threshold, and an MCS threshold in Table 12 and Table 13; or the protocol specifies a BW threshold and an MCS threshold, and the network device configures a frequency domain density value; or the protocol specifies a frequency domain density value, and the network device configures a BW threshold and an MCS threshold. This is not limited in this embodiment of this application.

TABLE 12

|  | $MCS_2 \leq MCS < MCS_3$ | $MCS_1 \leq MCS < MCS_2$ | $0 \leq MCS < MCS_1$ |
|---|---|---|---|
| $0 \leq N_{RB} < N_{RB1}$ | 0 | 0 | 0 |
| $N_{RB1} \leq N_{RB} < N_{RB2}$ | 1/4 | 1/8 | 0 |
| $N_{RB2} \leq N_{RB} < N_{RB3}$ | 1/8 | 1/16 | 0 |
| $N_{RB3} \leq N_{RB} < N_{RB4}$ | 1/16 | 1/32 | 0 |

TABLE 13

|  | $MCS_2 \leq MCS < MCS_3$ | $MCS_1 \leq MCS < MCS_2$ | $0 \leq MCS < MCS_1$ |
|---|---|---|---|
| $0 \leq N_{RB} < N_{RB1}$ | {0, 1/4} | {0, 1/8} | {0, 1/16} |
| $N_{RB1} \leq N_{RB} < N_{RB2}$ | {1/8, 1/4} | {1/8, 1/16} | {0, 1/16} |
| $N_{RB2} \leq N_{RB} < N_{RB3}$ | {1/16, 1/8} | {1/16, 1/32} | {0, 1/32} |
| $N_{RB3} \leq N_{RB} < N_{RB4}$ | {1/16, 1/8} | {1/16, 1/8} | {0, 1/32} |

Optionally, S240 includes: the network device transmits the first correspondence to the terminal device by using RRC signaling. The terminal device receives the first correspondence transmitted by the network device by using the RRC signaling.

In a fifth manner, before S210, the method 200 further includes S250: The network device transmits thresholds of a plurality of MCS intervals to the terminal device by using RRC signaling, where the plurality of MCS intervals correspond to a plurality of time domain density subsets and/or a plurality of frequency domain density subsets on a one-to-one basis.

Optionally, the terminal device determines, based on the thresholds of the plurality of MCS intervals, the plurality of time domain density subsets corresponding to the plurality of MCS intervals; and the terminal device determines, in the plurality of time domain density subsets based on the time domain density subset used for transmitting the PTRS by the terminal device and indicated by the second indication information, the time domain density subset used for transmitting the PTRS by the terminal device.

Optionally, the terminal device determines, based on the thresholds of the plurality of MCS intervals, the plurality of frequency domain density subsets corresponding to the plurality of MCS intervals; and the terminal device determines, in the plurality of frequency domain density subsets based on the frequency domain density subset used for transmitting the PTRS by the terminal device and indicated by the second indication information, the frequency domain density subset used for transmitting the PTRS by the terminal device.

For example, the $MCS_1$, the $MCS_2$, the $MCS_3$, and the $MCS_4$ in the foregoing tables are thresholds corresponding to a plurality of MCS intervals. Using Table 2 as an example for description, a lower threshold corresponding to the first MCS interval is 0, and an upper threshold is the $MCS_1$; a lower threshold corresponding to the second MCS interval is the $MCS_1$, and an upper threshold is the $MCS_2$; and a lower threshold corresponding to the third MCS interval is the $MCS_2$, and an upper threshold is the $MCS_3$. When the network device transmits the plurality of thresholds to the terminal device, the terminal device maps the three MCS intervals to time domain density subsets {0, 1/4}, {1/4, 1/2}, and {1/2, 1} stored by the terminal device. To be specific, the protocol may specify a specific time domain density subset and/or frequency domain density subset, and the network device only needs to transmit the thresholds of the MCS intervals. Then the MCS intervals are mapped to the time domain density subset and/or the frequency domain density subset based on a specific rule. The specific rule may be specified by the protocol or configured by the network device. This is not limited in this embodiment of this application.

S260. The terminal device transmits the PTRS to the network device based on the time domain density and/or the frequency domain density, and the network device receives the PTRS based on the time domain density and/or the frequency domain density.

It should be understood that, in this embodiment of this application, Table 1 to Table 6 and Table 9 to Table 11 are mapping relationships between MCSs and time domain densities and/or frequency domain densities, where the mapping relationships may be referred to as first mapping relationships; Table 7 and Table 8 are mapping relationships between BWs and time domain densities and/or frequency domain densities, where the mapping relationships may be referred to as second mapping relationships. Optionally, when both a first mapping relationship and a second mapping relationship exist, the terminal device determines, based on the first mapping relationship, the time domain density and/or the frequency domain density for transmitting the PTRS by the terminal device or the network device, but ignores the second mapping relationship, that is, a priority of the first mapping relationship may be higher than a priority of the second mapping relationship; or the terminal device may determine, based on the second mapping relationship, the time domain density and/or the frequency domain density for transmitting the PTRS by the terminal device or the network device, but ignores the first mapping relationship, and in this case, a priority of the second mapping relationship is higher than a priority of the first mapping relationship. This is not limited in this embodiment of this application.

Figure 5:
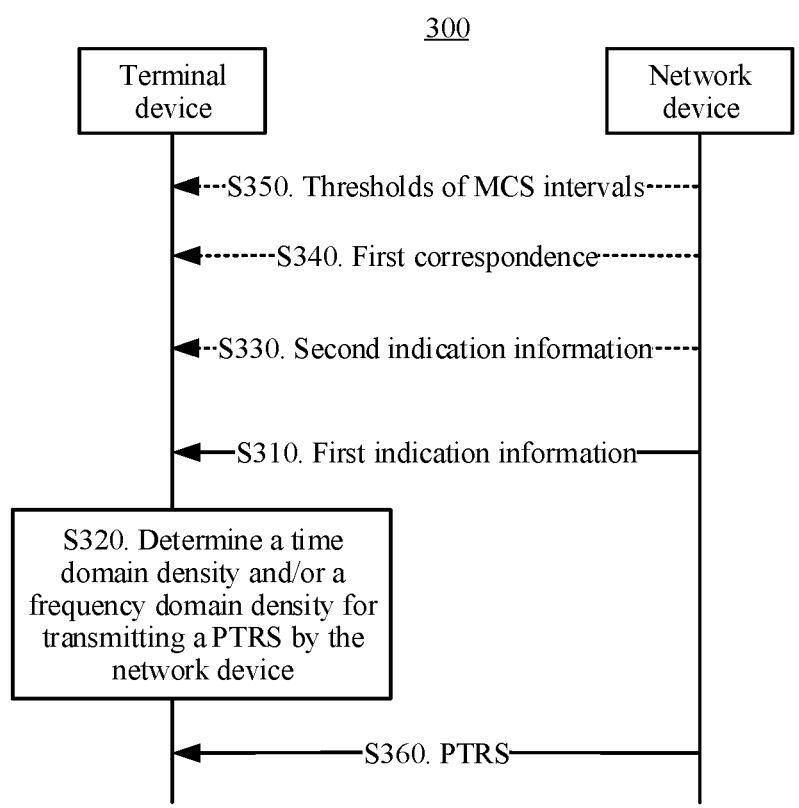
FIG. 5 is a schematic diagram of another reference signal indication method according to an embodiment of this application.

FIG. 5 shows a reference signal indication method 300 according to an embodiment of this application. The method 300 may be applied to the communications system 100 shown in FIG. 1. However, this embodiment of this application is not limited to this.

S310. A network device transmits first indication information to a terminal device, where the first indication information is used to indicate a time domain density and/or a frequency domain density for transmitting a PTRS by the network device.

S320. The terminal device receives the first indication information transmitted by the network device, and determines, based on the first indication information, the time domain density and/or the frequency domain density for transmitting the PTRS by the network device.

The terminal device determines, in the following five manners, the time domain density and/or the frequency domain density for transmitting the PTRS by the network device.

A first manner is similar to the first manner in the method 200, and a difference lies in that, in the method 200, the time domain density and/or the frequency domain density for transmitting the PTRS by the terminal device are/is determined, but in the method 300, because the first indication information is used to indicate the time domain density and/or the frequency domain density for transmitting the PTRS by the network device, the terminal device determines the time domain density and/or the frequency domain density for transmitting the PTRS by the network device. Details are not described herein to avoid repetition.

A second manner is similar to the second manner in the method 200, and a difference lies in that, the time domain density subset and/or the frequency domain density subset determined in the method 200 are/is a subset for transmitting the PTRS by the terminal device, but a time domain density subset and/or a frequency domain density subset determined in the method 300 are/is a subset for transmitting the PTRS by the network device.

In a third manner, before S310, the method 300 further includes S330: The network device transmits second indication information to the terminal device, where the second indication information is used to indicate a time domain density subset and/or a frequency domain density subset used for transmitting the PTRS by the network device. The terminal device receives the second indication information. The terminal device determines, based on the second indication information, the time domain density subset used for transmitting the PTRS by the network device; and the terminal device determines, in the time domain density subset based on the time domain density used for transmitting the PTRS by the network device and indicated by the first indication information, the time domain density for transmitting the PTRS by the network device; and that the terminal device determines, based on the first indication information, the frequency domain density in a frequency domain density subset used by the network device includes: the terminal device determines, based on the second indication information, the frequency domain density subset used for transmitting the PTRS by the network device; and the terminal device determines, in the frequency domain density subset based on the frequency domain density used for transmitting the PTRS by the network device and indicated by the first indication information, the frequency domain density for transmitting the PTRS by the network device.

Specifically, how the second indication information indicates the time domain density subset and/or the frequency domain density subset is similar to the third manner in the method 200. Details are not described again herein to avoid repetition.

In a fourth manner, before S310, the method 300 further includes S340: The network device transmits a first correspondence to the terminal device, and the terminal device receives the first correspondence transmitted by the network device. The first correspondence is used to indicate that a plurality of MCS intervals correspond to a plurality of time domain density subsets and/or a plurality of frequency domain density subsets on a one-to-one basis.

Optionally, that the terminal device determines, based on the second indication information, a time domain density subset used for transmitting the PTRS by the network device includes: the terminal device determines, based on the first correspondence, the plurality of time domain density subsets corresponding to the plurality of MCS intervals; and the terminal device determines, in the plurality of time domain density subsets based on the time domain density subset used for transmitting the PTRS by the network device and indicated by the second indication information, the time domain density subset used for transmitting the PTRS by the network device.

Optionally, that the terminal device determines, based on the second indication information, a frequency domain density subset used for transmitting the PTRS by the network device includes: the terminal device determines, based on the first correspondence, the plurality of frequency domain density subsets corresponding to the plurality of MCS intervals; and the terminal device determines, in the plurality of frequency domain density subsets based on the frequency domain density subset used for transmitting the PTRS by the network device and indicated by the second indication information, the frequency domain density subset used for transmitting the PTRS by the network device.

Specifically, how the first correspondence indicates the plurality of MCS intervals and the plurality of time domain density subsets and/or the plurality of frequency domain density subsets is similar to the fourth manner in the method 200. Details are not described again herein to avoid repetition.

In a fifth manner, before S310, the method 300 further includes S350: The network device transmits thresholds of a plurality of MCS intervals to the terminal device by using RRC signaling, where the plurality of MCS intervals correspond to a plurality of time domain density subsets and/or a plurality of frequency domain density subsets on a one-to-one basis.

Optionally, that the terminal device determines, based on the second indication information, a time domain density subset used for transmitting the PTRS by the network device includes: the terminal device determines, based on the thresholds of the plurality of MCS intervals, the plurality of time domain density subsets corresponding to the plurality of MCS intervals; and the terminal device determines, in the plurality of time domain density subsets based on the time domain density subset used for transmitting the PTRS by the network device and indicated by the second indication information, the time domain density subset used for transmitting the PTRS by the network device.

Optionally, that the terminal device determines, based on the second indication information, a frequency domain density subset used for transmitting the PTRS by the network device includes: the terminal device determines, based on the thresholds of the plurality of MCS intervals, the plurality of frequency domain density subsets corresponding to the plurality of MCS intervals; and the terminal device determines, in the plurality of frequency domain density subsets based on the frequency domain density subset used for transmitting the PTRS by the network device and indicated by the second indication information, the frequency domain density subset used for transmitting the PTRS by the network device.

Specifically, how the RRC signaling indicates the thresholds of the plurality of MCS intervals and the plurality of time domain density subsets and/or the plurality of frequency domain density subsets is similar to the fifth manner in the method 200. Details are not described again herein to avoid repetition.

S360. The network device transmits the PTRS to the terminal device based on the time domain density and/or the frequency domain density, and the terminal device receives the PTRS based on the time domain density and/or the frequency domain density.

In an optional embodiment, in the method 200 and the method 300, S210 or S310 includes: the network device transmits the first indication information to the terminal device by using DCI. S220 or S320 includes: the terminal device receives the first indication information transmitted by the network device by using the DCI. Optionally, S210 or S310 further includes: the network device transmits the first indication information to the terminal device by using system information or RRC signaling. S220 or S310 further includes: the terminal device receives the first indication information transmitted by the network device by using the system information or the RRC signaling. To be specific, resources for transmitting DCI are relatively scarce. When data occupying a relatively small resource is transmitted, the data may be transmitted by using the DCI. A period of transmitting system information or RRC signaling by the network device is relatively long, and resources for transmitting the system information or the RRC signaling are relatively sufficient in comparison with the resources for transmitting the DCI. When data occupying a relatively large resource is transmitted, the data may be transmitted by using the system information or the RRC signaling. Therefore, resources can be utilized properly, and resource utilization can be improved. Certainly, this is not limited in this embodiment of this application.

In an optional embodiment, in the method 200 or the method 300, that the network device transmits second indication information to the terminal device includes: the network device transmits the second indication information to the terminal device by using RRC signaling. That the terminal device receives the second indication information includes: the terminal device receives the second indication information transmitted by the network device by using the RRC signaling. Optionally, that the network device transmits the second indication information to the terminal device includes: the network device transmits the second indication information to the terminal device by using DCI or system information; and that the terminal device receives the second indication information includes: the terminal device receives the second indication information transmitted by the network device by using the DCI or the system information.

In an optional embodiment, the time domain density subset in the method 200 and the method 300 includes a time domain density value 0, and the frequency domain density subset includes a frequency domain density value 0. When the time domain density value is 0, it indicates that the PTRS is muted in time domain, that is, the terminal device or the network device does not transmit the PTRS. The frequency domain density value 0 indicates that the PTRS is muted in frequency domain, that is, the terminal device or the network device does not transmit the PTRS.

In an optional embodiment, in the method 200 or the method 300, the time domain density subset includes two optional time domain density values, and the frequency domain density subset includes two optional frequency domain density values. To be specific, when the time domain density subset and the frequency domain density subset respectively include two optional density values, the first indication information that may be transmitted by the network device to the terminal device may be a 1-bit information indication field. For example, when the 1-bit information indication field is 1, it may indicate one density value; and when the 1-bit information indication field is 0, it may indicate another density value. This can reduce signaling overheads.

In an optional embodiment, in the method 200 and the method 300, the first indication information is specifically an n-bit information indication field, n is a positive integer greater than or equal to 1, a combination of 0 and 1 in the n-bit information indication field corresponds to a plurality of second time domain density values and/or corresponds to a plurality of second frequency domain density values, the plurality of second time domain density values include the time domain density, and the plurality of second frequency domain density values include the frequency domain density.

In an optional embodiment, in the method 200 or the method 300, the method is applied to a DFT-s-OFDM waveform or applied to a CP-OFDM waveform.

Specifically, when a quantity of optional symbol-level time domain densities of PTRSs in the DFT-s-OFDM waveform is the same as a quantity of optional time domain densities of PTRSs in the CP-OFDM waveform, and a symbol-level time domain density value in the DFT-s-OFDM waveform is also the same as a time domain density value in the CP-OFDM waveform, a symbol-level time domain density of PTRSs in the DFT-s-OFDM waveform is a time domain density of PTRSs in the CP-OFDM waveform; or when a quantity of optional symbol-level time domain densities of PTRSs in the DFT-s-OFDM waveform is the same as a quantity of optional time domain densities in the CP-OFDM waveform, but time domain density values are different, a correspondence may be formed between a time domain density of PTRSs in the DFT-s-OFDM waveform and a time domain density of PTRSs in the CP-OFDM waveform. A greatest time domain density of PTRSs in the DFT-s-OFDM waveform may correspond to a greatest time domain density of PTRSs in the CP-OFDM waveform, a second greatest time domain density of PTRSs in the DFT-s-OFDM waveform may correspond to a second greatest time domain density of PTRSs in the CP-OFDM waveform, and so on, and a smallest time domain density of PTRSs in the DFT-s-OFDM waveform corresponds to a smallest time domain density of PTRSs in the CP-OFDM waveform. For example, optional time domain densities of PTRSs in the CP-OFDM waveform are {1, 1/2, 1/4}, and optional symbol-level time domain densities of PTRSs in the DFT-s-OFDM waveform are {1, 1/3, 1/5}; in this case, a time domain density 1 of PTRSs in the CP-OFDM waveform is a time domain density 1 of PTRSs in the DFT-s-OFDM waveform, a time domain density 1/2 of PTRSs in the CP-OFDM waveform is a time domain density 1/3 of PTRSs in the DFT-s-OFDM waveform, and a time domain density 1/4 of PTRSs in the CP-OFDM waveform is a time domain density 1/5 of PTRSs in the DFT-s-OFDM waveform.

Optionally, a similar correspondence exists between a frequency domain density of PTRSs in CP-OFDM and a density of PTRSs on a sampling point level in DFT-s-OFDM. For example, a greatest frequency domain density of PTRSs in CP-OFDM corresponds to a greatest time domain density of PTRSs on the sampling point level in DFT-s-OFDM, a second greatest frequency domain density of PTRSs in CP-OFDM corresponds to a second greatest time domain density of PTRSs on the sampling point level in DFT-s-OFDM, and so on.

Figure 6:
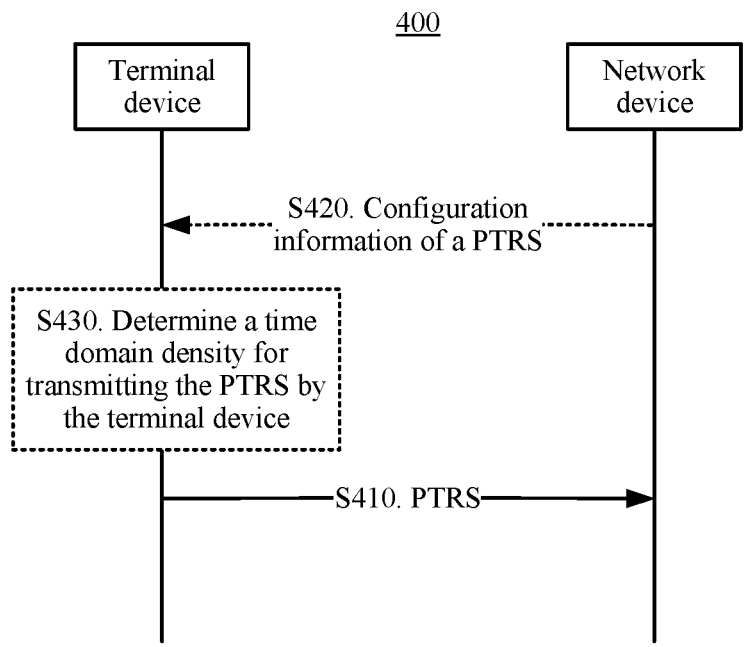
FIG. 6 is a schematic diagram of still another reference signal indication method according to an embodiment of this application.

FIG. 6 shows a reference signal indication method 400 according to an embodiment of this application. The method 400 may be applied to the communications system 100 shown in FIG. 1. However, this embodiment of this application is not limited to this.

S410. A terminal device transmits a PTRS to a network device based on a time domain density, and the network device receives the PTRS transmitted by the terminal device based on the time domain density, where the time domain density is a density in a DFT-s-OFDM waveform.

Optionally, the time domain density may be a density specified by a protocol or may be a density configured by the network device for the terminal device.

Optionally, before S410, the method 400 further includes S420: The network device transmits configuration information of the PTRS to the terminal device, where the configuration information of the PTRS is used to indicate the time domain density for transmitting the PTRS by the terminal device; and S420 includes: the terminal device receives the configuration information that is of the PTRS and is transmitted by the network device by using DCI or system information or RRC signaling.

Optionally, after S420, the method further includes S430: The terminal device determines, based on the configuration information of the PTRS, the time domain density for transmitting the PTRS.

Specifically, that the terminal device determines, based on the configuration information of the PTRS, the time domain density for transmitting the PTRS includes: the terminal device determines a time domain density on a sampling point level based on the configuration information of the PTRS; and/or the terminal device determines a time domain density on a symbol level based on the configuration information of the PTRS.

Optionally, S410 includes: the terminal device transmits the PTRS to the network device based on the time domain density on the symbol level and/or the time domain density on the sampling point level. Specifically, the terminal device may transmit the PTRS to the network device based on a predefined time domain density on the symbol level and/or a predefined time domain density on the sampling point level, or the terminal device may determine the time domain density on the symbol level and/or the time domain density on the sampling point level based on the configuration information of the PTRS, and then transmit the PTRS to the network device based on the determined time domain density on the symbol level and the determined time domain density on the sampling point level.

Figure 7:
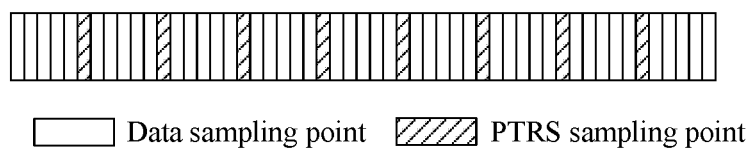
FIG. 7 is a schematic diagram of a time domain density on a sampling point level in DFT-s-OFDM.

Specifically, the time domain density includes the time domain density on the sampling point level and/or the time domain density on the symbol level. The time domain density on the sampling point level may include three optional manners. 1. PTRS sampling points may be evenly distributed in a DFT-s-OFDM symbol, for example, as shown in FIG. 7. In this manner, a phase error of each PTRS sampling point may be estimated independently. Further, a phase error of an adjacent data sampling point may be estimated through interpolation. This method makes a phase tracking interval smaller. However, interference and additional noise from neighboring user equipment (UE) or a neighboring cell affect phase estimation of each PTRS sampling point, causing phase estimation to be inaccurate. However, in a scenario in which adverse impact of phase noise is insignificant, for example, when an fc is not very high, phase noise does not need to be estimated for each sampling point separately, but only a CPE of a single DFT-s-OFDM symbol needs to be estimated. In this case, a CPE may be estimated by averaging estimated phase noise on all PTRS sampling points evenly distributed in a single DFT-s-OFDM symbol. In a scenario in which only a CPE is required, a manner of evenly distributing PTRS sampling points may be used.

Figure 8:
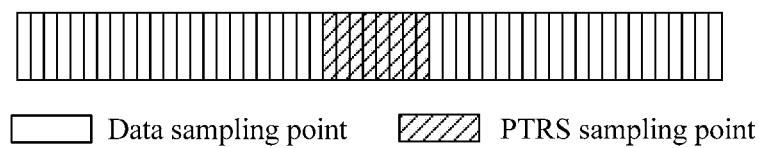
FIG. 8 is a schematic diagram of another time domain density on a sampling point level in DFT-s-OFDM.

2. PTRS sampling points may be centrally distributed in a DFT-s-OFDM symbol, for example, as shown in FIG. 8. Averaging processing performed on phase estimation of a plurality of PTRS sampling points can reduce additional noise from a neighboring terminal device or a neighboring cell. However, there is a great difference between phase estimation of data sampling points and phase estimation of PTRS sampling points, causing the estimation to be inaccurate.

Figure 9:
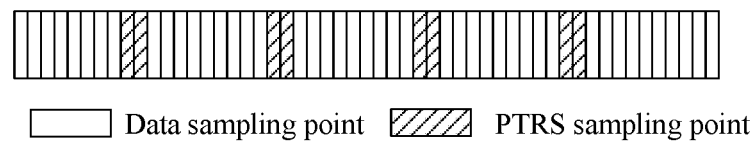
FIG. 9 is a schematic diagram of still another time domain density on a sampling point level in DFT-s-OFDM.

3. The first and second optional manners are leveraged. PTRS sampling points may be distributed in a DFT-s-OFDM symbol based on a block (using a block as a unit), and each block includes a plurality of (more than one) consecutive PTRS sampling points, for example, as shown in FIG. 9. Averaging performed on estimated phase errors of PTRS sampling points in a PTRS block can reduce adverse impact of interference and additive noise from neighboring UE or a neighboring cell. In addition, by using a plurality of PTRS blocks, a phase error of data can be estimated through time domain interpolation, and a relatively good phase tracking resolution can be obtained. The PTRS block may be related to an order of an MCS. Specifically, when the MCS is greater than a lowest threshold of the MCS, if the order of the MCS is higher, the PTRS block is shorter; or if the order of the MCS is lower, the PTRS block is longer. The lowest threshold of the MCS is predefined by the protocol or configured by the network device. This is not limited in this application. A length of a PTRS block is a quantity of consecutive sampling points before a reference sampling point or a quantity of consecutive sampling points after a reference sampling point or a quantity of consecutive sampling points on both sides of a reference sampling point, where the reference sampling point is an $n^{th}$ sampling point in the PTRS block. If the reference sampling point is the first sampling point, the length of the PTRS block is a quantity of consecutive PTRS sampling points after the reference sampling point and including the reference sampling point. If the reference sampling point is the last sampling point in the PTRS block, the length of the PTRS block is a quantity of consecutive PTRS sampling points before the reference sampling point and including the reference sampling point. If the reference sampling point is a sampling point other than the first sampling point and the last sampling point in the PTRS block, the length of the PTRS block is a quantity of consecutive PTRS sampling points on both sides of the reference sampling point and including the reference sampling point. A location (that is, a numeric value of n) of the reference sampling point in the PTRS block and a location (that is, a location of the PTRS block in the DFT-s-OFDM symbol) of the reference sampling point in the DFT-s-OFDM symbol are predefined by the protocol or configured by the network device. This is not limited in this application.

Figure 10:
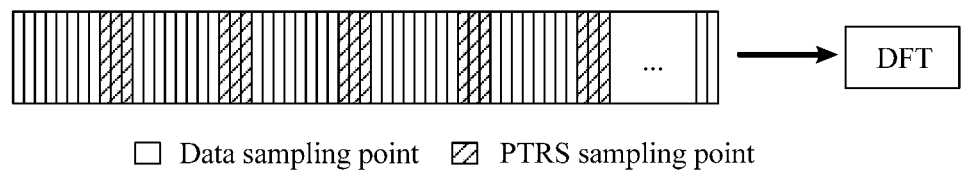
FIG. 10 is a schematic diagram of still another time domain density on a sampling point level in DFT-s-OFDM.

For example, as shown in FIG. 10, if the reference sampling point is the first sampling point in the first PTRS block, that is, the ninth grid counting from left to right as shown in FIG. 10, the first PTRS block includes two sampling points after the reference sampling point, and therefore, the length of the PTRS block is 3; if the reference sampling point is the last sampling point in the first PTRS block, that is, the eleventh grid counting from left to right as shown in FIG. 10, the first PTRS block includes two sampling points before the reference sampling point, and therefore, the length of the PTRS block is 3; or if the reference sampling point is the second sampling point in the first PTRS block, that is, the tenth grid counting from left to right as shown in FIG. 10, the first PTRS block includes one sampling point before the reference sampling point and one sampling point after the reference sampling point, and therefore, the length of the PTRS block is 3.

Implementation levels of devices from terminal device manufacturers are different, and different terminal devices have phase noise on different levels. Therefore, patterns or densities of PTRSs of the terminal devices need to be configured independently based on phase noise levels of the terminal devices. A symbol-level time domain density of PTRSs in DFT-s-OFDM is associated with at least one of an MCS and an fc value, that is, an association relationship exists. A time domain density of PTRSs on the sampling point level in DFT-s-OFDM is associated with a BW, and a pattern of PTRSs on the sampling point level in the DFT-s-OFDM symbol is associated with at least one of an MCS and an fc value. An association relationship between a density of PTRSs and at least one of the MCS, the BW, and the fc value may be predefined or configured by using higher layer signaling.

In an optional embodiment, the time domain density is specifically a time domain density on the sampling point level, for transmitting the PTRS by the terminal device. Optionally, the time domain density on the sampling point level is associated with at least one of a scheduled BW value, an MCS, and an fc value of the terminal device, that is, an association relationship exists.

Specifically, the time domain density on the sampling point level may be a ratio of a quantity of PTRS sampling points in a unit DFT-s-OFDM symbol to a quantity of sampling points in the DFT-s-OFDM symbol, or the time domain density on the sampling point level may be a quantity of PTRS sampling points in a unit DFT-s-OFDM symbol, or the time domain density on the sampling point level may be a ratio of a quantity of PTRSs or a quantity of PTRS sampling points in every n sampling points to n sampling points. As shown in FIG. 10, assuming that FIG. 10 is one DFT-s-OFDM symbol, and that one PTRS block is mapped to three consecutive sampling points in every q sampling points, the time domain density on the sampling point level is 1/q, where 1/q indicates that one PTRS block exists in every q sampling points in a unit DFT-s-OFDM symbol. A quantity of PTRS blocks in a DFT-s-OFDM shown in FIG. 10 is 5. A length of a DFT-s-OFDM symbol includes 15 (3*5) sampling PTRS symbols in total, where 3 indicates a quantity of PTRS sampling points in each small block, and 5 indicates a quantity of small blocks.

In an optional embodiment, the time domain density is specifically a symbol-level time domain density for transmitting the PTRS by the terminal device. Optionally, the symbol-level time domain density is associated with an MCS value. Optionally, the symbol-level time domain density of PTRSs in DFT-s-OFDM is the same as the time domain density of PTRSs in CP-OFDM. For example, the symbol-level time domain density of PTRSs in DFT-s-OFDM is 1, 1/2, or 1/4, where 1 represents that a PTRS is mapped to every DFT-s-OFDM symbol, 1/2 represents that a PTRS is mapped to one of every two DFT-s-OFDM symbols, and 1/4 represents that a PTRS is mapped to one of every four DFT-s-OFDM symbols. The symbol-level time domain density is associated with an MCS value. The association relationship may be predefined by the protocol or configured by the network device by using higher layer signaling, where the higher layer signaling may be RRC signaling or MAC CE signaling. This is not limited in this application. For example, Table 14 shows an association relationship between a symbol-level time domain density in DFT-s-OFDM and an MCS value, where the association relationship is defined in the following table. Similarly to CP-OFDM, the network device may transmit the table to the terminal device by using higher layer signaling, or an optional symbol-level time domain density in a right column in the table is predefined by the protocol, and the network device may configure an MCS threshold in a left column and transmit a specific MCS threshold to the terminal device by using higher layer signaling. Optionally, the symbol-level time domain density is associated with an fc value. If fc is larger and a phase noise level is higher, the symbol-level time domain density is also higher. The association relationship may be predefined by the protocol or configured by the network device by using higher layer signaling, where the higher layer signaling may be RRC signaling or MAC CE signaling.

TABLE 14

| MCS value | Symbol-level time domain density |
|---|---|
| $0 \leq MCS < MCS_1$ | 0 |
| $MCS_1 \leq MCS < MCS_2$ | 1/4 |
| $MCS_2 \leq MCS < MCS_3$ | 1/2 |
| $MCS_3 \leq MCS < MCS_4$ | 1 |

In an optional embodiment, the time domain density is specifically a time domain density on the sampling point level, for transmitting the PTRS by the terminal device. Optionally, the time domain density on the sampling point level is associated with a scheduled BW value. The association relationship may be predefined by the protocol or configured by the network device by using higher layer signaling, where the higher layer signaling may be RRC signaling or MAC CE signaling. This is not limited in this application. For example, Table 15 shows a correspondence between a time domain density on a sampling point level in DFT-s-OFDM and a BW value. Similarly to CP-OFDM, the network device may transmit the table to the terminal device by using higher layer signaling, or an optional time domain density on the sampling point level in a right column in the table is predefined by the protocol, and the network device may configure an BW threshold in a left column and transmit a specific BW threshold to the terminal device by using higher layer signaling. A meaning of a specific numeric value of the time domain density on the sampling point level in the following table is a quantity of PTRS blocks in every n sampling points in a DFT-s-OFDM symbol. A numerator is the quantity of PTRS blocks in the DFT-s-OFDM symbol, and a denominator is $n_0$, $n_1$, or $n_2$, where $n_0$, $n_1$, or $n_2$ is an integer greater than or equal to 1. Assuming that a time domain density $1/n_0$ on the sampling point level is 1/16, it indicates that one PTRS block exists in every 16 sampling points.

TABLE 15

| BW value | Time domain density on the sampling point level |
|---|---|
| $0 \le N_{RB} < N_{RB1}$ | 0 |
| $N_{RB1} \le N_{RB} < N_{RB2}$ | $1/n_0$ |
| $N_{RB2} \le N_{RB} < N_{RB3}$ | $1/n_1$ |
| $N_{RB3} < N_{RB}$ | $1/n_2$ |

In an optional embodiment, the time domain density is specifically a time domain density on the sampling point level, for transmitting the PTRS by the terminal device, and is specifically a length of a PTRS block in a DFT-s-OFDM symbol. Optionally, the length of the PTRS block in the DFT-s-OFDM symbol is associated with an MCS value. The association relationship may be predefined by the protocol or configured by the network device by using higher layer signaling, where the higher layer signaling may be RRC signaling or MAC CE signaling. This is not limited in this application. Similarly to CP-OFDM, for example, Table 16 shows a correspondence between a length of a PTRS block in DFT-s-OFDM and an MCS value. The network device may transmit the table to the terminal device by using higher layer signaling, or an optional length of a PTRS block in a right column in the table is predefined by the protocol, and the network device may configure an MCS threshold in a left column and transmit a specific MCS threshold to the terminal device by using higher layer signaling. In the following table, when the MCS value is greater than or equal to an $MCS_1$, the length of the PTRS block decreases as the MCS value increases. To be specific, in the following table, $N_0 \ge N_1 \ge N_2$, where $N_0$, $N_1$, and $N_2$ are all positive integers greater than or equal to 1.

TABLE 16

| MCS value | Length of the PTRS block |
|---|---|
| $0 \le MCS < MCS_1$ | 0 |
| $MCS_1 \le MCS < MCS_2$ | $N_0$ |
| $MCS_2 \le MCS < MCS_3$ | $N_1$ |
| $MCS_3 < MCS$ | $N_2$ |

Figure 11:
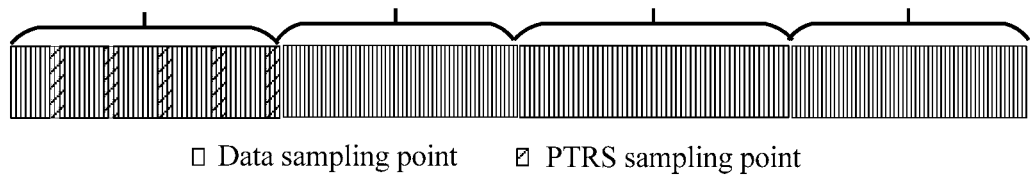
FIG. 11 is a schematic diagram of a time domain density on a symbol level in DFT-s-OFDM.

Specifically, the symbol-level time domain density may be a ratio of DFT-s-OFDM symbols to which a PTRS is mapped in every n DFT-s-OFDM symbols, to n DFT-s-OFDM symbols. As shown in FIG. 11, assuming that a PTRS is mapped to one (for example, the first DFT-s-OFDM symbol) of every four DFT-s-OFDM symbols, the symbol-level time domain density is 1/4.

Figure 12:
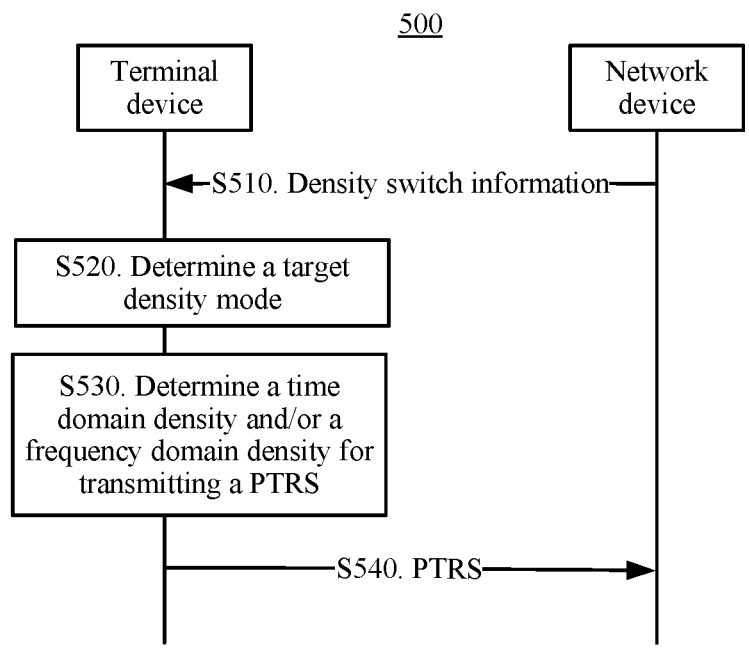
FIG. 12 is a schematic diagram of still another reference signal indication method according to an embodiment of this application.

FIG. 12 shows a reference signal indication method 500 according to an embodiment of this application. The method 500 may be applied to the communications system 100 shown in FIG. 1. However, this embodiment of this application is not limited to this.

S510. A network device transmits density switch information to a terminal device, where the density switch information is used to indicate that the terminal device is to switch between a first density mode and a second density mode, the first density mode is a highest time domain density (for example, 1) used for transmitting a PTRS by the terminal device, and/or a highest frequency domain density (for example, 1/4) used for transmitting a PTRS by the terminal device, the second density mode is a time domain density and/or a frequency domain density used for transmitting a PTRS by the terminal device and determined by the terminal device based on a correspondence, and the correspondence is used to indicate a correspondence between a transmission parameter and at least one time domain density value, and/or at least one frequency domain density value.

In an optional embodiment, the density switch information is specifically used to indicate that the terminal device is currently in a first operation mode or a second operation mode, where the first operation mode is that the terminal device is in an MU-MIMO mode, the second operation mode is that the terminal device is in an SU-MIMO mode, the plurality of terminal devices include the terminal device, the first operation mode corresponds to the first density mode, and the second operation mode corresponds to the second density mode.

Specifically, the density switch information is specifically a 1-bit information indication field; and when the 1-bit information indication field is 1, the density switch information is used to indicate that the terminal device is currently in the first operation mode; or when the 1-bit information indication field is 0, the density switch information is used to indicate that the terminal device is currently in the second operation mode. Alternatively, when the 1-bit information indication field is 1, the density switch information is used to indicate that the terminal device is currently in the second operation mode; or when the 1-bit information indication field is 0, the density switch information is used to indicate that the terminal device is currently in the first operation mode.

In an optional embodiment, the transmission parameter includes at least one of an MCS, a quantity of RBs, a subcarrier spacing, and an SINR. Using the MCS as an example, the correspondence may be a mapping relationship shown in Table 1 to Table 11.

S520. The terminal device receives the density switch information, and the terminal device determines, based on the density switch information, a target density mode used for transmitting the PTRS by the terminal device, where the target density mode is the first density mode or the second density mode.

Specifically, if the network device knows that the terminal device is currently in the first density mode, and the network device determines that a current transmission condition or application scenario of the terminal device is not suitable for determining the time domain density and/or the frequency domain density by using the first density mode, the network device may transmit the density switch information to the terminal device to indicate that the terminal device is to switch from the current first density mode to the second density mode, where the second density mode is the target density mode. If the network device knows that the terminal device is currently in the second density mode, and the network device determines that a current transmission condition or application scenario of the terminal device is not suitable for determining the time domain density and/or the frequency domain density by using the second density mode, the network device may transmit the density switch information to the terminal device to indicate that the terminal device is to switch from the current second density mode to the first density mode, where the first density mode is the target density mode.

In an optional embodiment, S510 includes: the network device transmits the density switch information to the terminal device by using DCI; and S520 includes: the terminal device receives the density switch information transmitted by the network device by using the DCI. Optionally, S510 includes: the network device transmits the density switch information to the terminal device by using system information or RRC signaling; and S520 includes: the terminal device receives the density switch information transmitted by the network device by using the system information or the RRC signaling. This is not limited in this embodiment of this application.

S530. The terminal device determines, based on the target density mode, the time domain density and/or the frequency domain density for transmitting the PTRS by the terminal device.

Specifically, if the target density mode is the first density mode, the terminal device may determine that the time domain density for transmitting the PTRS by the terminal device is the highest time domain density (for example, 1), and the terminal device transmits the PTRS to the network device based on the highest time domain density, and/or the terminal device may determine that the frequency domain density for transmitting the PTRS by the terminal device is the highest frequency domain density (for example, 1/4), and the terminal device transmits the PTRS to the network device based on the highest frequency domain density (for example, 1/4). If the target density mode is the second density mode, the terminal device may determine the time domain density and/or the frequency domain density based on the correspondence and the transmission parameter, and the terminal device transmits the PTRS to the network device based on the determined time domain density and/or frequency domain density.

S540. The terminal device transmits the PTRS to the network device based on the time domain density and/or the frequency domain density.

Figure 13:
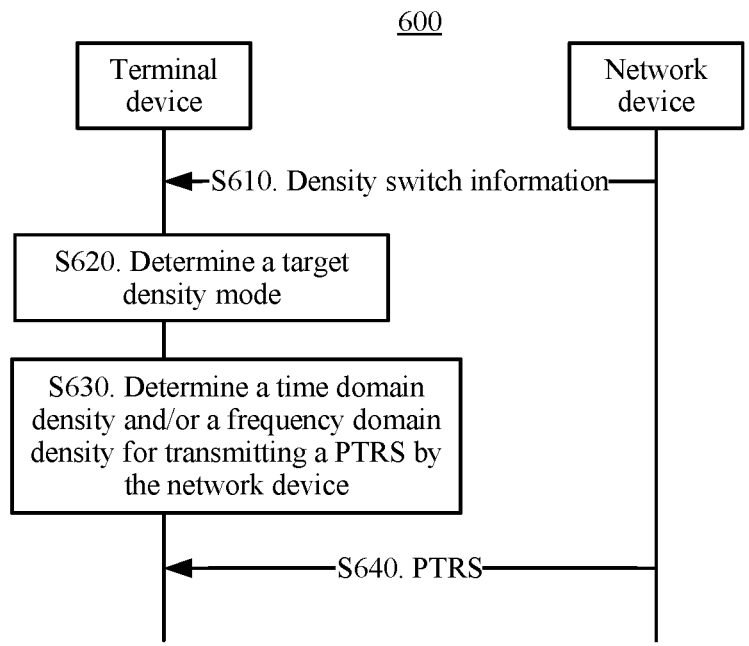
FIG. 13 is a schematic diagram of still another reference signal indication method according to an embodiment of this application.

FIG. 13 shows a reference signal indication method 600 according to an embodiment of this application. The method 600 may be applied to the communications system 100 shown in FIG. 1. However, this embodiment of this application is not limited to this.

S610. A network device transmits density switch information to a terminal device, where the density switch information is used to indicate that the network device is to switch between a first density mode and a second density mode, the first density mode is a highest time domain density used for transmitting a PTRS by the network device, and/or a highest frequency domain density used for transmitting a PTRS by the network device, the second density mode is a time domain density and/or a frequency domain density used for transmitting a PTRS by the network device and determined by the terminal device based on a correspondence, and the correspondence is used to indicate a correspondence between a transmission parameter and at least one time domain density value, and/or at least one frequency domain density value.

In an optional embodiment, the density switch information is specifically used to indicate that the network device is currently in a first operation mode or a second operation mode, where the first operation mode is that the network device is in an MU-MIMO mode, the second operation mode is that the network device is in an SU-MIMO mode, the plurality of terminal devices include the terminal device, the first operation mode corresponds to the first density mode, and the second operation mode corresponds to the second density mode.

Specifically, the density switch information is specifically a 1-bit information indication field; and when the 1-bit information indication field is 1, the density switch information is used to indicate that the network device is currently in the first operation mode; or when the 1-bit information indication field is 0, the density switch information is used to indicate that the network device is currently in the second operation mode. Alternatively, when the 1-bit information indication field is 1, the density switch information is used to indicate that the network device is currently in the second operation mode; or when the 1-bit information indication field is 0, the density switch information is used to indicate that the network device is currently in the first operation mode.

In an optional embodiment, the transmission parameter includes at least one of an MCS, a quantity of RBs, a subcarrier spacing, and an SINR. Using the MCS as an example, the correspondence may be a mapping relationship shown in Table 1 to Table 16.

S620. The terminal device receives the density switch information, and the terminal device determines, based on the density switch information, a target density mode used for transmitting the PTRS by the network device, where the target density mode is the first density mode or the second density mode.

Specifically, if the terminal device knows that the network device is currently in the first density mode, and the network device determines that a current transmission condition or application scenario is not suitable for determining the time domain density and/or the frequency domain density by using the first density mode, the network device may transmit the density switch information to the terminal device to indicate that the network device is to switch from the current first density mode to the second density mode, where the second density mode is the target density mode. If the terminal device knows that the network device is currently in the second density mode, and the network device determines that a current transmission condition or application scenario is not suitable for determining the time domain density and/or the frequency domain density by using the second density mode, the network device may transmit the density switch information to indicate to the terminal device that the network device is to switch from the current second density mode to the first density mode, where the first density mode is the target density mode.

In an optional embodiment, S610 includes: the network device transmits the density switch information to the terminal device by using DCI; and S620 includes: the terminal device receives the density switch information transmitted by the network device by using the DCI. Optionally, S610 includes: the network device transmits the density switch information to the terminal device by using system information or RRC signaling; and S620 includes: the terminal device receives the density switch information transmitted by the network device by using the system information or the RRC signaling. This is not limited in this embodiment of this application.

S630. The terminal device determines, based on the target density mode, the time domain density and/or the frequency domain density for transmitting the PTRS by the network device.

Specifically, if the target density mode is the first density mode, the terminal device may determine that the time domain density for transmitting the PTRS by the network device is the highest time domain density (for example, 1), and the network device transmits the PTRS to the terminal device based on the highest time domain density, and/or the terminal device may determine that the frequency domain density for transmitting the PTRS by the network device is the highest frequency domain density (for example, 1/4), and the network device transmits the PTRS to the terminal device based on the highest frequency domain density (for example, 1/4). If the target density mode is the second density mode, the terminal device may determine the time domain density and/or the frequency domain density based on the correspondence and the transmission parameter, and the network device transmits the PTRS to the terminal device based on the determined time domain density and/or frequency domain density.

S640. The terminal device receives the PTRS transmitted by the network device based on the time domain density and/or the frequency domain density.

Figure 14:
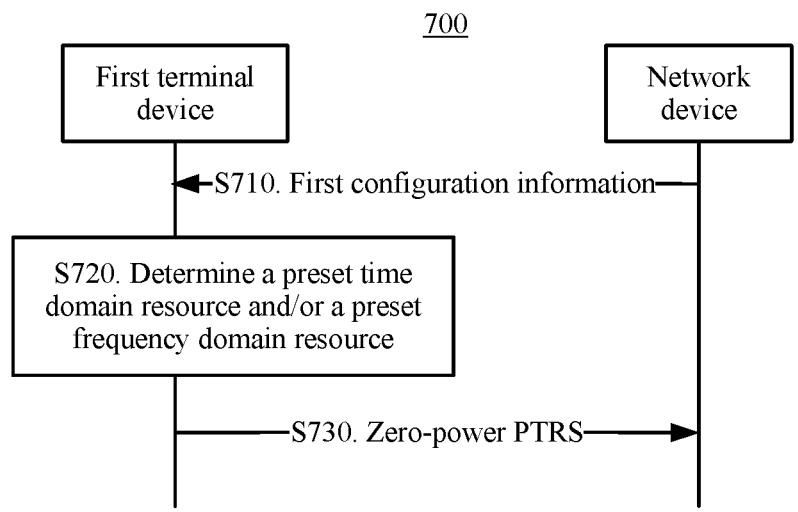
FIG. 14 is a schematic diagram of still another reference signal indication method according to an embodiment of this application.

FIG. 14 shows a reference signal indication method 700 according to an embodiment of this application. The method 700 may be applied to the communications system 100 shown in FIG. 1. However, this embodiment of this application is not limited to this.

S710. A network device transmits first configuration information to a first terminal device, where the first configuration information is used to indicate that the first terminal device is to transmit a ZP-PTRS on a time domain resource and/or a frequency domain resource.

Optionally, the time domain resource and the frequency domain resource may be resources configured by the network device. For example, the network device may transmit the first configuration information to the terminal device by using a MIB or a SIB. Certainly, the time domain resource and the frequency domain resource may also be resources specified by a protocol. This is not limited in this embodiment of this application.

It should be understood that, the ZP-PTRS may be referred to as a muting PTRS or muting PTRS data.

In an optional embodiment, the network device transmits second configuration information to a second terminal device; the second terminal device receives the second configuration information transmitted by the network device, where the second configuration information is used to indicate that the second terminal device is to transmit an NZP-PTRS on the time domain resource and/or the frequency domain resource; and the second terminal device transmits the NZP-PTRS on the time domain resource and/or the frequency domain resource based on the second configuration information. Optionally, that the network device transmits second configuration information to a second terminal device includes: the network device transmits the second configuration information to the second terminal device by using DCI. That the second terminal device receives the second configuration information transmitted by the network device includes: the second terminal device receives the second configuration information transmitted by the network device by using the DCI.

S720. The first terminal device receives the first configuration information transmitted by the network device, and the first terminal device determines, based on the first configuration information, that a resource for transmitting the ZP-PTRS by the first terminal device is the time domain resource and/or the frequency domain resource.

S730. The first terminal device transmits the ZP-PTRS on the time domain resource and/or the frequency domain resource to the network device, and the network device receives the ZP-PTRS transmitted by the first terminal device.

Therefore, in the reference signal indication method provided by this embodiment of this application, the first terminal device and the second terminal device may be terminal devices in an MU-MIMO mode. When the first terminal device and the second terminal device perform data transmission with the network device simultaneously, the first terminal device transmits a ZP-PTRS in a time domain resource position and/or a frequency domain resource position in which the second terminal device transmits data, that is, the first terminal device does not transmit data. This can avoid interference between the first terminal device and the second terminal device. Certainly, when the first terminal device and the second terminal device both transmit NZP-PTRSs on a same time domain resource and/or frequency domain resource, the NZP-PTRSs transmitted by the two terminal devices may be scrambled by using different scrambling sequences to avoid interference, or a space division multiplexing mode is used to avoid interference. To be specific, as long as a plurality of terminal devices are to transmit NZP-PTRSs and/or data in a same resource position, the network device may transmit the first configuration information to the terminal devices that are to transmit data in the resource position, to instruct the terminal devices to transmit ZP-PTRSs in the resource position and avoid interference to transmitted data.

Figure 15:
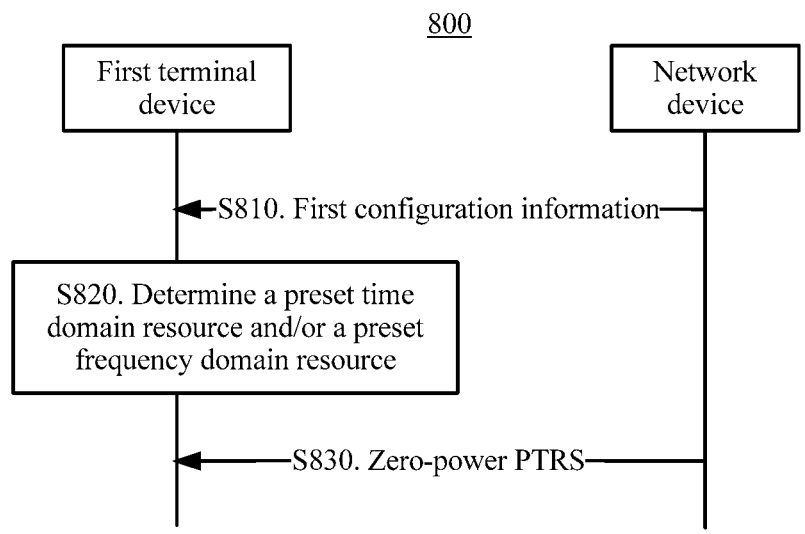
FIG. 15 is a schematic diagram of still another reference signal indication method according to an embodiment of this application.

FIG. 15 shows a reference signal indication method 800 according to an embodiment of this application. The method 800 may be applied to the communications system 100 shown in FIG. 1. However, this embodiment of this application is not limited to this.

S810. A network device transmits first configuration information to a first terminal device, where the first configuration information is used to indicate that the network device is to transmit a ZP-PTRS on a time domain resource and/or a frequency domain resource.

Optionally, the time domain resource and the frequency domain resource may be resources configured by the network device. For example, the network device may transmit the first configuration information to the terminal device by using a MIB or a SIB. Certainly, the time domain resource and the frequency domain resource may also be resources specified by a protocol. This is not limited in this embodiment of this application.

It should be understood that, the ZP-PTRS may be referred to as a muting PTRS or muting PTRS data.

In an optional embodiment, the network device transmits second configuration information to a second terminal device; the second terminal device receives the second configuration information transmitted by the network device, where the second configuration information is used to indicate that the network device is to transmit an NZP-PTRS on the time domain resource and/or the frequency domain resource; and the network device transmits the NZP-PTRS on the time domain resource and/or the frequency domain resource based on the second configuration information. Optionally, that the network device transmits second configuration information to a second terminal device includes: the network device transmits the second configuration information to the second terminal device by using DCI. That the second terminal device receives the second configuration information transmitted by the network device includes: the second terminal device receives the second configuration information transmitted by the network device by using the DCI.

S820. The first terminal device receives the first configuration information transmitted by the network device, and the first terminal device determines, based on the first configuration information, that a resource for transmitting the ZP-PTRS by the network device is the time domain resource and/or the frequency domain resource.

S830. The network device transmits the PTRS on the time domain resource and/or the frequency domain resource to the first terminal device, and the first terminal device receives, on the time domain resource and/or the frequency domain resource, the ZP-PTRS transmitted by the network device.

Therefore, in the reference signal indication method provided by this embodiment of this application, the first terminal device and the second terminal device may be terminal devices in an MU-MIMO mode. When the first terminal device and the second terminal device perform data transmission with the network device simultaneously, the second terminal device receives, on a preset time domain resource and/or frequency domain resource, an NZP-PTRS transmitted by the network device, and the first terminal device receives, on the preset time domain resource and/or frequency domain resource, a ZP-PTRS transmitted by the network device, that is, the first terminal device does not receive data. This can avoid interference between the first terminal device and the second terminal device. Certainly, when the network device transmits NZP-PTRSs on a same time domain resource and/or frequency domain resource to both the first terminal device and the second terminal device, the NZP-PTRSs transmitted to the two terminal devices may be scrambled by using different scrambling sequences to avoid interference, or a space division multiplexing mode is used to avoid interference. To be specific, as long as a plurality of terminal devices are to receive NZP-PTRSs and/or data in a same resource position, the network device may transmit the first configuration information to the first terminal device that is to receive data in the resource position, to indicate to the first terminal device that the network device transmits a ZP-PTRS in the resource position, and the first terminal device receives the ZP-PTRS in the resource position, to avoid interference to the transmitted data.

Figure 16:
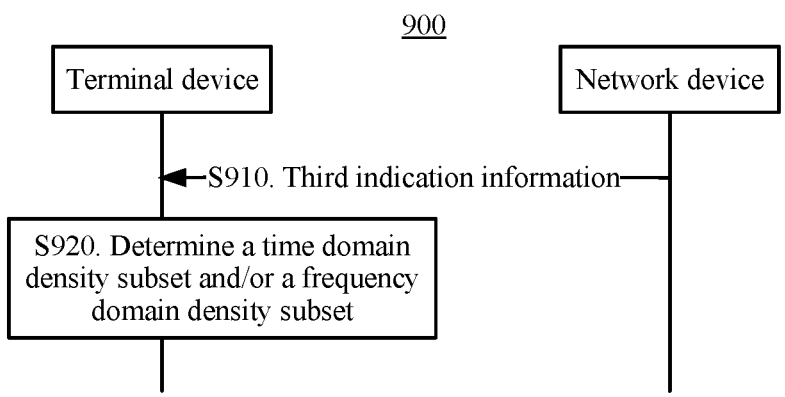
FIG. 16 is a schematic diagram of still another reference signal indication method according to an embodiment of this application.

FIG. 16 shows a reference signal indication method 900 according to an embodiment of this application. The method 900 may be applied to the communications system 100 shown in FIG. 1. However, this embodiment of this application is not limited to this.

S910. A network device transmits third indication information to a terminal device, where the third indication information is used to indicate a time domain density subset and/or a frequency domain density subset used for transmitting a PTRS by the terminal device or the network device.

In an optional embodiment, S910 includes: the network device transmits the third indication information to the terminal device by using DCI. That the terminal device receives the third indication information transmitted by the network device includes: the terminal device receives the third indication information transmitted by the network device by using the DCI.

S920. The terminal device receives the third indication information, and the terminal device determines, based on the third indication information, the time domain density subset and/or the frequency domain density subset used for transmitting the PTRS by the terminal device or the network device.

In an optional embodiment, before S910, the method further includes: the network device transmits fourth indication information to the terminal device, where the fourth indication information is used to indicate that a plurality of MCS intervals correspond to a plurality of time domain density subsets and/or a plurality of frequency domain density subsets on a one-to-one basis; and the terminal device receives the fourth indication information transmitted by the network device. S920 includes: the terminal device determines the plurality of time domain density subsets based on the fourth indication information; and the terminal device determines a time domain density in the plurality of time domain density subset based on the third indication information; and/or the terminal device determines the plurality of frequency domain density subsets based on the fourth indication information; and the terminal device determines a frequency domain density in the plurality of frequency domain density subset.

In an optional embodiment, that the network device transmits fourth indication information to the terminal device includes: the network device transmits the fourth indication information to the terminal device by using RRC signaling; and that the terminal device receives the fourth indication information transmitted by the network device includes: the terminal device receives the fourth indication information transmitted by the network device by using the RRC signaling.

In an optional embodiment, the time domain density subset includes a time domain density value 0, and/or the frequency domain density subset includes a frequency domain density value 0.

It should be understood that, Table 1 to Table 15 mentioned in the embodiments of this application are intended for better illustrating the reference signal indication methods, and do not constitute any limitation on the embodiments of this application.

The foregoing describes the reference signal indication methods according to the embodiments of this application in detail with reference to FIG. 1 to FIG. 16. The following describes reference signal indication apparatuses according to the embodiments of this application in detail with reference to FIG. 17 to FIG. 36.

Figure 17:
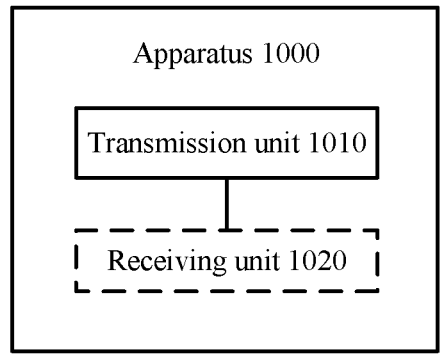
FIG. 17 is a schematic diagram of a reference signal indication apparatus according to an embodiment of this application.

FIG. 17 shows a reference signal indication apparatus 1000 according to an embodiment of this application. The apparatus 1000 includes:

a transmission unit 1010, configured to transmit first indication information to a terminal device, where the first indication information is used to indicate a time domain density and/or a frequency domain density for transmitting a PTRS by the terminal device or the apparatus device.

In an optional embodiment, the transmission unit 1010 is further configured to: before transmitting the first indication information to the terminal device, transmit second indication information to the terminal device, where the second indication information is used to indicate a time domain density subset and/or a frequency domain density subset used for transmitting the PTRS by the terminal device or the apparatus.

In an optional embodiment, the transmission unit 1010 is specifically configured to transmit the second indication information to the terminal device by using RRC signaling.

In an optional embodiment, the transmission unit 1010 is further configured to: before transmitting the first indication information to the terminal device, transmit a first correspondence to the terminal device, where the first correspondence is used to indicate a one-to-one correspondence between a plurality of MCS intervals and a plurality of time domain density subsets and/or a plurality of frequency domain density subsets.

In an optional embodiment, the first correspondence is determined based on a second correspondence between a BW and a plurality of first time domain density values and/or a plurality of first frequency domain density values, elements in the plurality of time domain density subsets are at least some of the plurality of first time domain density values, and elements in the plurality of frequency domain density subsets are at least some of the plurality of first frequency domain density values.

In an optional embodiment, the transmission unit 1010 is further specifically configured to transmit the first correspondence to the terminal device by using RRC signaling.

In an optional embodiment, the transmission unit 1010 is further configured to: before transmitting the first indication information to the terminal device, transmit thresholds of the plurality of MCS intervals to the terminal device by using RRC signaling, where the plurality of MCS intervals correspond to the plurality of time domain density subsets and/or the plurality of frequency domain density subsets on a one-to-one basis.

In an optional embodiment, the time domain density subset includes a time domain density value 0, and the frequency domain density subset includes a frequency domain density value 0.

In an optional embodiment, the time domain density subset includes two optional time domain density values, and the frequency domain density subset includes two frequency domain density values.

In an optional embodiment, the transmission unit 1010 is further specifically configured to transmit the first indication information to the terminal device by using DCI.

In an optional embodiment, the first indication information is specifically an n-bit information indication field, n is a positive integer greater than or equal to 1, a combination of 0 and 1 in the n-bit information indication field corresponds to a plurality of second time domain density values and/or corresponds to a plurality of second frequency domain density values, the plurality of second time domain density values include the time domain density, and the plurality of second frequency domain density values include the frequency domain density.

In an optional embodiment, the apparatus further includes a receiving unit 1020, configured to: after the first indication information is transmitted to the terminal device, receive the PTRS transmitted by the terminal device based on the first indication information.

In an optional embodiment, the transmission unit 1010 is further configured to: after the first indication information is transmitted to the terminal device, transmit the PTRS to the terminal device based on the first indication information.

It should be understood that, herein the apparatus 1000 is represented in a form of a functional unit. Herein the term "unit" may be an application-specific integrated circuit (ASIC), an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1000 may be specifically the network device in the embodiments of the method 200 and the method 300; and the apparatus 1000 may be configured to perform each procedure and/or step corresponding to the network device in the embodiments of the method 200 and the method 300. Details are not described again herein to avoid repetition.

Figure 18:
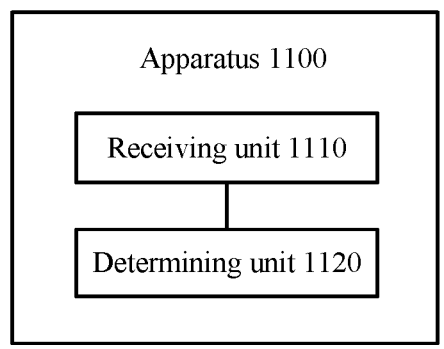
FIG. 18 is a schematic diagram of another reference signal indication apparatus according to an embodiment of this application.

FIG. 18 shows a reference signal indication apparatus 1100 according to an embodiment of this application. The apparatus 1100 includes:

a receiving unit 1110, configured to receive first indication information transmitted by a network device, where the first indication information is used to indicate a time domain density and/or a frequency domain density for transmitting a PTRS by the network device or the apparatus; and a determining unit 1120, configured to determine, based on the first indication information, the time domain density and/or the frequency domain density for transmitting the PTRS by the network device or the apparatus.

In an optional embodiment, the determining unit 1120 is specifically configured to: determine, based on the first indication information, the time domain density in a time domain density subset used by the network device or the apparatus; and/or determine, based on the first indication information, the frequency domain density in a frequency domain density subset used by the network device or the apparatus.

In an optional embodiment, the receiving unit 1110 is further configured to: before the time domain density in the time domain density subset used by the network device or the apparatus is determined based on the first indication information, and/or before the frequency domain density in the frequency domain density subset used by the network device or the apparatus is determined based on the first indication information, receive second indication information transmitted by the network device, where the second indication information is used to indicate the time domain density subset and/or the frequency domain density subset used for transmitting the PTRS by the network device or the apparatus;

the determining unit 1120 is further specifically configured to: determine, based on the second indication information, the time domain density subset used for transmitting the PTRS by the network device or the apparatus; and determine, in the time domain density subset based on the time domain density used for transmitting the PTRS by the network device or the apparatus and indicated by the first indication information, the time domain density for transmitting the PTRS by the network device or the apparatus; and the determining unit 1120 is further specifically configured to: determine, based on the second indication information, the frequency domain density subset used for transmitting the PTRS by the network device or the apparatus; and determine, in the frequency domain density subset based on the frequency domain density used for transmitting the PTRS by the network device or the apparatus and indicated by the first indication information, the frequency domain density for transmitting the PTRS by the network device or the apparatus.

In an optional embodiment, the receiving unit 1110 is specifically configured to receive the second indication information transmitted by the network device by using RRC signaling.

In an optional embodiment, the receiving unit 1110 is further configured to: before receiving the first indication information transmitted by the network device, receive a first correspondence transmitted by the network device, where the first correspondence is used to indicate a one-to-one correspondence between a plurality of MCS intervals and a plurality of time domain density subsets and/or a plurality of frequency domain density subsets; and the determining unit 1120 is further specifically configured to: determine, based on the first correspondence, the plurality of time domain density subsets corresponding to the plurality of MCS intervals; and determine, in the plurality of time domain density subsets based on the time domain density subset used for transmitting the PTRS by the network device or the apparatus and indicated by the second indication information, the time domain density subset used for transmitting the PTRS by the network device or the apparatus; and/or the determining unit 1120 is further specifically configured to: determine, based on the first correspondence, the plurality of frequency domain density subsets corresponding to the plurality of MCS intervals; and determine, in the plurality of frequency domain density subsets based on the frequency domain density subset used for transmitting the PTRS by the network device or the apparatus and indicated by the second indication information, the frequency domain density subset used for transmitting the PTRS by the network device or the apparatus.

In an optional embodiment, the receiving unit 1110 is further specifically configured to receive the first correspondence transmitted by the network device by using RRC signaling.

In an optional embodiment, the receiving unit 1110 is further configured to: before receiving the first indication information transmitted by the network device, receive thresholds of the plurality of MCS intervals transmitted by the network device by using RRC signaling, where the plurality of MCS intervals correspond to the plurality of time domain density subsets and/or the plurality of frequency domain density subsets on a one-to-one basis; and the determining unit 1120 is further specifically configured to: determine, based on the thresholds of the plurality of MCS intervals, the plurality of time domain density subsets corresponding to the plurality of MCS intervals; and determine, in the plurality of time domain density subsets based on the time domain density subset used for transmitting the PTRS by the network device or the apparatus and indicated by the second indication information, the time domain density subset used for transmitting the PTRS by the network device or the apparatus; and/or the determining unit 1120 is further specifically configured to:

determine, based on the thresholds of the plurality of MCS intervals, the plurality of frequency domain density subsets corresponding to the plurality of MCS intervals; and determine, in the plurality of frequency domain density subsets based on the frequency domain density subset used for transmitting the PTRS by the network device or the apparatus and indicated by the second indication information, the frequency domain density subset used for transmitting the PTRS by the network device or the apparatus.

In an optional embodiment, the time domain density subset includes a time domain density value 0, and the frequency domain density subset includes a frequency domain density value 0.

In an optional embodiment, the time domain density subset includes two optional time domain density values, and the frequency domain density subset includes two frequency domain density values.

In an optional embodiment, the receiving unit 1110 is specifically configured to receive the first indication information transmitted by the network device by using DCI.

In an optional embodiment, the first indication information is specifically an n-bit information indication field, n is a positive integer greater than or equal to 1, a combination of 0 and 1 in the n-bit information indication field corresponds to a plurality of second time domain density values and/or corresponds to a plurality of second frequency domain density values, the plurality of second time domain density values include the time domain density, and the plurality of second frequency domain density values include the frequency domain density.

In an optional embodiment, the apparatus 1100 further includes a transmission unit, configured to: after the time domain density and/or the frequency domain density for transmitting the PTRS by the apparatus are/is determined based on the first indication information, transmit the PTRS to the network device based on the time domain density and/or the frequency domain density.

In an optional embodiment, the receiving unit 1110 is further configured to: after the time domain density and/or the frequency domain density for transmitting the PTRS by the network device are/is determined based on the first indication information, receive the PTRS transmitted by the network device based on the time domain density and/or the frequency domain density.

It should be understood that, herein the apparatus 1100 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1100 may be specifically the terminal device in the embodiments of the method 200 and the method 300; and the apparatus 1100 may be configured to perform each procedure and/or step corresponding to the terminal device in the embodiments of the method 200 and the method 300. Details are not described again herein to avoid repetition.

Figure 19:
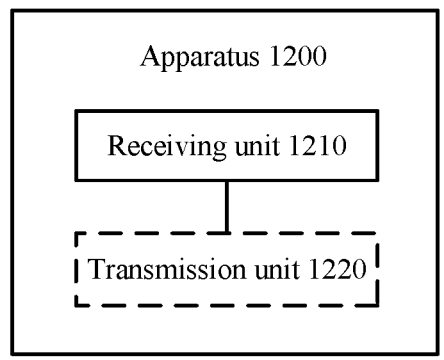
FIG. 19 is a schematic diagram of still another reference signal indication apparatus according to an embodiment of this application.

FIG. 19 shows a reference signal indication apparatus 1200 according to an embodiment of this application. The apparatus 1200 includes:

a receiving unit 1210, configured to receive a PTRS transmitted by a terminal device based on a time domain density, where the time domain density is a density in a DFT-s-OFDM waveform.

In an optional embodiment, the apparatus further includes a transmission unit 1220, configured to transmit configuration information of the PTRS to the terminal device before the PTRS transmitted by the terminal device based on the time domain density is received, where the configuration information of the PTRS is used to indicate the time domain density for transmitting the PTRS by the terminal device.

In an optional embodiment, the time domain density is specifically a symbol-level time domain density for transmitting the PTRS by the terminal device.

In an optional embodiment, the symbol-level time domain density is associated with an MCS value.

In an optional embodiment, the time domain density is specifically a time domain density on a sampling point level, for transmitting the PTRS by the terminal device.

In an optional embodiment, the time domain density on the sampling point level is associated with at least one of a scheduled BW value, an MCS, and an fc value of the terminal device, that is, an association relationship exists.

It should be understood that, herein the apparatus 1200 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1200 may be specifically the network device in the embodiment of the method 400; and the apparatus 1200 may be configured to perform each procedure and/or step corresponding to the network device in the embodiment of the method 400. Details are not described again herein to avoid repetition.

Figure 20:
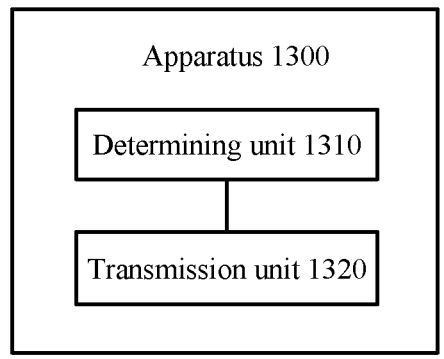
FIG. 20 is a schematic diagram of still another reference signal indication apparatus according to an embodiment of this application.

FIG. 20 shows a reference signal indication apparatus 1300 according to an embodiment of this application. The apparatus 1300 includes:

a determining unit 1310, configured to determine a time domain density for transmitting a PTRS; and a transmission unit 1320, configured to transmit the PTRS to a network device based on the time domain density, where the time domain density is a density in a DFT-s-OFDM waveform.

In an optional embodiment, the apparatus further includes a receiving unit, configured to receive configuration information that is of the PTRS and is transmitted by the network device, where the configuration information of the PTRS is used to indicate the time domain density for transmitting the PTRS by the apparatus; and the determining unit 1310 is specifically configured to determine, based on the configuration information of the PTRS, the time domain density for transmitting the PTRS.

In an optional embodiment, the time domain density is specifically a symbol-level time domain density for transmitting the PTRS by the apparatus, and the transmission unit 1320 is specifically configured to transmit the PTRS to the network device based on the symbol-level time domain density.

In an optional embodiment, the symbol-level time domain density is associated with an MCS value.

In an optional embodiment, the time domain density is specifically a time domain density on a sampling point level, for transmitting the PTRS by the apparatus, and the transmission unit 1320 is further specifically configured to transmit the PTRS to the network device based on the time domain density on the sampling point level.

In an optional embodiment, the time domain density on the sampling point level is associated with at least one of a scheduled BW value, an MCS, and an fc value of the apparatus, that is, an association relationship exists.

It should be understood that, herein the apparatus 1300 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1300 may be specifically the terminal device in the embodiment of the method 400; and the apparatus 1300 may be configured to perform each procedure and/or step corresponding to the terminal device in the embodiment of the method 400. Details are not described again herein to avoid repetition.

Figure 21:
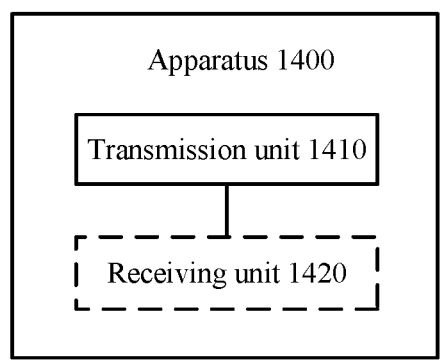
FIG. 21 is a schematic diagram of still another reference signal indication apparatus according to an embodiment of this application.

FIG. 21 shows a reference signal indication apparatus 1400 according to an embodiment of this application. The apparatus 1400 includes:

a transmission unit 1410, configured to transmit density switch information to a terminal device, where the density switch information is used to indicate that the terminal device or the apparatus is to switch between a first density mode and a second density mode, the first density mode is a highest time domain density used for transmitting a PTRS by the terminal device or the apparatus, and/or a highest frequency domain density used for transmitting a PTRS by the terminal device or the apparatus, the second density mode is a time domain density and/or a frequency domain density used for transmitting a PTRS by the terminal device or the apparatus and determined by the terminal device based on a correspondence, and the correspondence is used to indicate a correspondence between a transmission parameter and at least one time domain density value, and/or at least one frequency domain density value.

In an optional embodiment, the transmission unit 1410 is specifically configured to transmit the density switch information to the terminal device by using DCI.

In an optional embodiment, the density switch information is specifically used to indicate that the terminal device or the apparatus is currently in a first operation mode or a second operation mode, where the first operation mode is that the terminal device or the apparatus is in an MU-MIMO mode, the second operation mode is that the terminal device or the apparatus is in an SU-MIMO mode, the plurality of terminal devices include the terminal device, the first operation mode corresponds to the first density mode, and the second operation mode corresponds to the second density mode.

In an optional embodiment, the density switch information is specifically a 1-bit information indication field; and when the 1-bit information indication field is 1, the density switch information is used to indicate that the terminal device or the apparatus is currently in the first operation mode; or when the 1-bit information indication field is 0, the density switch information is used to indicate that the terminal device or the apparatus is currently in the second operation mode. Alternatively, when the 1-bit information indication field is 1, the density switch information is used to indicate that the terminal device or the apparatus is currently in the second operation mode; or when the 1-bit information indication field is 0, the density switch information is used to indicate that the terminal device or the apparatus is currently in the first operation mode.

In an optional embodiment, the transmission parameter includes at least one of an MCS, a quantity of RBs, a subcarrier spacing, and an SINR.

In an optional embodiment, the apparatus further includes a receiving unit 1420, configured to: after the density switch information is transmitted to the terminal device, receive the PTRS transmitted by the terminal device based on the density switch information.

In an optional embodiment, the transmission unit 1410 is further configured to: after the density switch information is transmitted to the terminal device, transmit the PTRS to the terminal device based on the density switch information.

It should be understood that, herein the apparatus 1400 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1400 may be specifically the network device in the embodiment of the method 500 or the method 600; and the apparatus 1400 may be configured to perform each procedure and/or step corresponding to the network device in the embodiment of the method 500 or the method 600. Details are not described again herein to avoid repetition.

Figure 22:
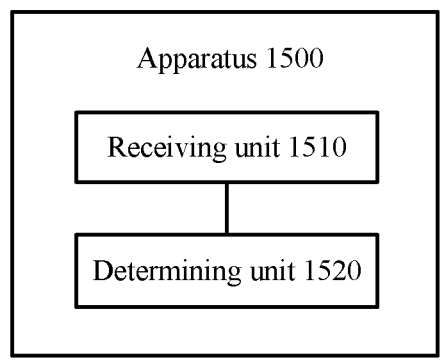
FIG. 22 is a schematic diagram of still another reference signal indication apparatus according to an embodiment of this application.

FIG. 22 shows a reference signal indication apparatus 1500 according to an embodiment of this application. The apparatus 1500 includes:

a receiving unit 1510, configured to receive density switch information transmitted by a network device, where the density switch information is used to indicate that the network device or the apparatus is to switch between a first density mode and a second density mode, the first density mode is a highest time domain density used for transmitting a PTRS by the network device or the apparatus, and/or a highest frequency domain density used for transmitting a PTRS by the network device or the apparatus, the second density mode is a time domain density and/or a frequency domain density used for transmitting a PTRS by the network device or the apparatus and determined by the apparatus based on a correspondence, and the correspondence is used to indicate a correspondence between a transmission parameter and at least one time domain density value, and/or at least one frequency domain density value; and a determining unit 1520, configured to determine, based on the density switch information, a target density mode used for transmitting the PTRS by the network device or the apparatus, where the target density mode is the first density mode or the second density mode.

The determining unit 1520 is further configured to determine, based on the target density mode, the time domain density and/or the frequency domain density for transmitting the PTRS by the network device or the apparatus.

In an optional embodiment, the receiving unit 1510 is specifically configured to receive the density switch information transmitted by the network device by using DCI.

In an optional embodiment, the density switch information is specifically used to indicate that the network device or the apparatus is currently in a first operation mode or a second operation mode, where the first operation mode is that the network device or the apparatus is in an MU-MIMO mode, the second operation mode is that the network device or the apparatus is in an SU-MIMO mode, the plurality of terminal devices include the apparatus, the first operation mode corresponds to the first density mode, and the second operation mode corresponds to the second density mode.

In an optional embodiment, the density switch information is specifically a 1-bit information indication field; and when the 1-bit information indication field is 1, the density switch information is used to indicate that the network device or the apparatus is currently in the first operation mode; or when the 1-bit information indication field is 0, the density switch information is used to indicate that the network device or the apparatus is currently in the second operation mode. Alternatively, when the 1-bit information indication field is 1, the density switch information is used to indicate that the network device or the apparatus is currently in the second operation mode; or when the 1-bit information indication field is 0, the density switch information is used to indicate that the network device or the apparatus is currently in the first operation mode.

In an optional embodiment, the transmission parameter includes at least one of an MCS, a quantity of RBs, a subcarrier spacing, and an SINR.

In an optional embodiment, the apparatus further includes a transmission unit, configured to transmit the PTRS to the network device based on the time domain density and/or the frequency domain density after the density switch information transmitted by the network device is received.

In an optional embodiment, the receiving unit is further configured to: after receiving the density switch information transmitted by the network device, receive the PTRS transmitted by the network device based on the density switch information.

It should be understood that, herein the apparatus 1500 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1500 may be specifically the terminal device in the embodiment of the method 500 or the method 600; and the apparatus 1500 may be configured to perform each procedure and/or step corresponding to the terminal device in the embodiment of the method 500 or the method 600. Details are not described again herein to avoid repetition.

Figure 23:
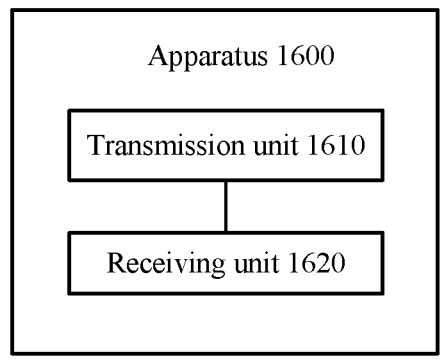
FIG. 23 is a schematic diagram of still another reference signal indication apparatus according to an embodiment of this application.

FIG. 23 shows a reference signal indication apparatus 1600 according to an embodiment of this application. The apparatus 1600 includes:

a transmission unit 1610, configured to transmit first configuration information to a first terminal device, where the first configuration information is used to indicate that the first terminal device or the apparatus is to transmit a ZP-PTRS on a time domain resource and/or a frequency domain resource; and a receiving unit 1620, configured to receive the ZP-PTRS transmitted by the first terminal device based on the first configuration information.

In an optional embodiment, the transmission unit 1610 is further configured to transmit second configuration information to a second terminal device, where the second configuration information is used to indicate that the second terminal device or the apparatus is to transmit an NZP-PTRS on the time domain resource and/or the frequency domain resource.

In an optional embodiment, the transmission unit 1610 is specifically configured to transmit the second configuration information to the second terminal device by using DCI.

In an optional embodiment, the transmission unit 1610 is further specifically configured to transmit the first configuration information to the first terminal device by using DCI.

It should be understood that, herein the apparatus 1600 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1600 may be specifically the network device in the embodiments of the method 700 and the method 800; and the apparatus 1600 may be configured to perform each procedure and/or step corresponding to the network device in the embodiments of the method 700 and the method 800. Details are not described again herein to avoid repetition.

Figure 24:
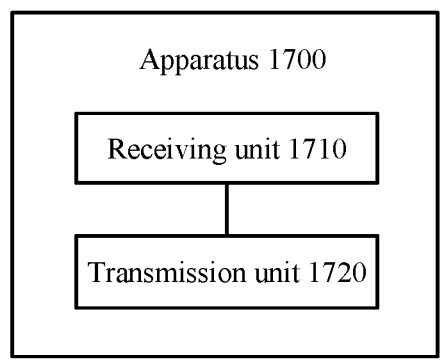
FIG. 24 is a schematic diagram of still another reference signal indication apparatus according to an embodiment of this application.

FIG. 24 shows a reference signal indication apparatus 1700 according to an embodiment of this application. The apparatus 1700 includes:

a receiving unit 1710, configured to receive first configuration information transmitted by a network device, where the first configuration information is used to indicate that the network device or the apparatus is to transmit a ZP-PTRS on a time domain resource and/or a frequency domain resource; and a transmission unit 1720, configured to transmit the ZP-PTRS to the network device based on the first configuration information, where the receiving unit 1710 is alternatively configured to receive the ZP-PTRS transmitted by the network device based on the first configuration information.

In an optional embodiment, the receiving unit 1710 is specifically configured to receive the first configuration information transmitted by the network device by using DCI.

It should be understood that, herein the apparatus 1700 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1700 may be specifically the first terminal device in the embodiments of the method 700 and the method 800; and the apparatus 1700 may be configured to perform each procedure and/or step corresponding to the first terminal device in the embodiments of the method 700 and the method 800. Details are not described again herein to avoid repetition.

Figure 25:
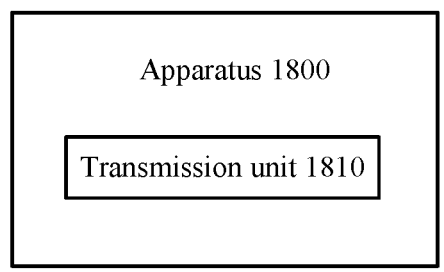
FIG. 25 is a schematic diagram of still another reference signal indication apparatus according to an embodiment of this application.

FIG. 25 shows a reference signal indication apparatus 1800 according to an embodiment of this application. The apparatus 1800 includes:

a transmission unit 1810, configured to transmit third indication information to a terminal device, where the third indication information is used to indicate a time domain density subset and/or a frequency domain density subset used for transmitting a PTRS by the terminal device or the apparatus.

It should be understood that, herein the apparatus 1800 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1800 may be specifically the network device in the embodiment of the method 900; and the apparatus 1800 may be configured to perform each procedure and/or step corresponding to the network device in the embodiment of the method 900. Details are not described again herein to avoid repetition.

Figure 26:
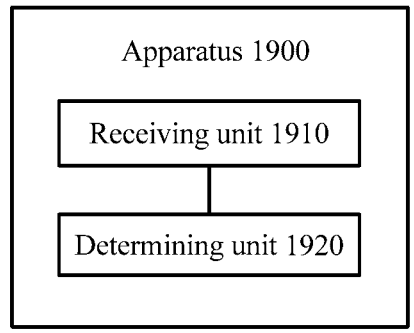
FIG. 26 is a schematic diagram of still another reference signal indication apparatus according to an embodiment of this application.

FIG. 26 shows a reference signal indication apparatus 1900 according to an embodiment of this application. The apparatus 1900 includes:

a receiving unit 1910, configured to receive third indication information transmitted by a network device, where the third indication information is used to indicate a time domain density subset and/or a frequency domain density subset used for transmitting a PTRS by the network device or the apparatus; and a determining unit 1920, configured to determine, based on the third indication information, the time domain density subset and/or the frequency domain density subset used for transmitting the PTRS by the network device or the apparatus.

It should be understood that, herein the apparatus 1900 is represented in a form of a functional unit. Herein the term "unit" may be an ASIC, an electronic circuit, a processor (for example, a shared processor, a dedicated processor, or a group processor) and a memory for executing one or more software or firmware programs, a combinational logic circuit, and/or other appropriate components that support the described functions. In an optional example, a person skilled in the art may understand that, the apparatus 1900 may be specifically the terminal device in the embodiment of the method 900; and the apparatus 1900 may be configured to perform each procedure and/or step corresponding to the terminal device in the embodiment of the method 900. Details are not described again herein to avoid repetition.

Any one of the apparatus 1000 to the apparatus 1900 completely corresponds to the terminal device or the network device in the method embodiment, and a corresponding unit performs a corresponding step. For example, a transmission unit performs a transmission step in the method embodiment, a receiving unit performs a reception step in the method embodiment, and other steps than transmission and reception may be performed by a processing unit. For a function of a specific unit, refer to a corresponding method embodiment. Details are not described again herein.

The network device and the terminal device in each of the foregoing solutions have functions for implementing corresponding steps performed by the network device and the terminal device in the foregoing method. The functions may be implemented by hardware, or may be implemented by corresponding software executed by hardware. The hardware or the software includes one or more units corresponding to the foregoing functions. For example, the transmission unit may be replaced with a transmitter, the receiving unit may be replaced with a receiver, and other units such as the processing unit may be replaced with a processor, to perform a transmission operation, a reception operation, and related processing operations respectively in each method embodiment.

Figure 27:
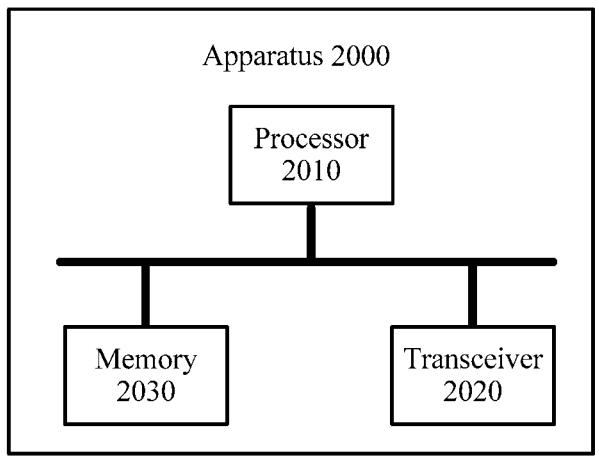
FIG. 27 is a schematic diagram of still another reference signal indication apparatus according to an embodiment of this application.

FIG. 27 shows still another reference signal indication apparatus 2000 according to an embodiment of this application. The apparatus 2000 includes a processor 2010, a transceiver 2020, and a memory 2030. The processor 2010, the transceiver 2020, and the memory 2030 communicate with each other by using an internal connection path. The memory 2030 is configured to store an instruction. The processor 2010 is configured to execute the instruction stored in the memory 2030, to control the transceiver 2020 to transmit a signal and/or receive a signal.

The transceiver 2020 is configured to transmit first indication information to a terminal device, where the first indication information is used to indicate a time domain density and/or a frequency domain density for transmitting a PTRS by the terminal device or the apparatus device.

It should be understood that, the apparatus 2000 may be specifically the network device in the embodiments of the method 200 and the method 300, and may be configured to perform each step and/or procedure corresponding to the network device in the embodiments of the method 200 and the method 300. Optionally, the memory 2030 may include a read-only memory (ROM) and a random access memory (RAM), and provide an instruction and data to the processor. A part of the memory may further include a non-volatile RAM. For example, the memory may further store information of a device type. The processor 2010 may be configured to execute the instruction stored in the memory, and when the processor 2010 executes the instruction stored in the memory, the processor 2010 is configured to perform each step and/or procedure corresponding to the network device in the embodiments of the method 200 and the method 300.

Figure 28:
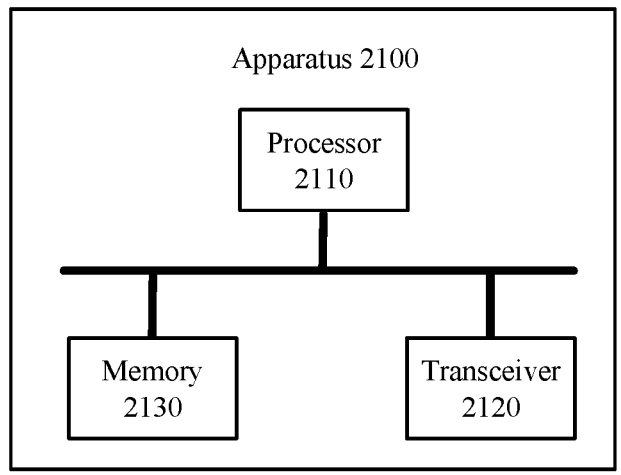
FIG. 28 is a schematic diagram of still another reference signal indication apparatus according to an embodiment of this application.

FIG. 28 shows still another reference signal indication apparatus 2100 according to an embodiment of this application. The apparatus 2100 includes a processor 2110, a transceiver 2120, and a memory 2130. The processor 2110, the transceiver 2120, and the memory 2130 communicate with each other by using an internal connection path. The memory 2130 is configured to store an instruction. The processor 2110 is configured to execute the instruction stored in the memory 2130, to control the transceiver 2120 to transmit a signal and/or receive a signal.

The transceiver 2120 is configured to receive first indication information transmitted by a network device, where the first indication information is used to indicate a time domain density and/or a frequency domain density for transmitting a PTRS by the network device or the apparatus. The processor 2110 is configured to determine, based on the first indication information, the time domain density and/or the frequency domain density for transmitting the PTRS by the network device or the apparatus.

It should be understood that, the apparatus 2100 may be specifically the terminal device in the embodiments of the method 200 and the method 300, and may be configured to perform each step and/or procedure corresponding to the terminal device in the embodiments of the method 200 and the method 300. Optionally, the memory 2130 may include a ROM and a RAM, and provide an instruction and data to the processor. A part of the memory may further include a non-volatile RAM. For example, the memory may further store information of a device type. The processor 2110 may be configured to execute the instruction stored in the memory, and when the processor 2110 executes the instruction stored in the memory, the processor 2110 is configured to perform each step and/or procedure corresponding to the terminal device in the embodiments of the method 200 and the method 300.

Figure 29:
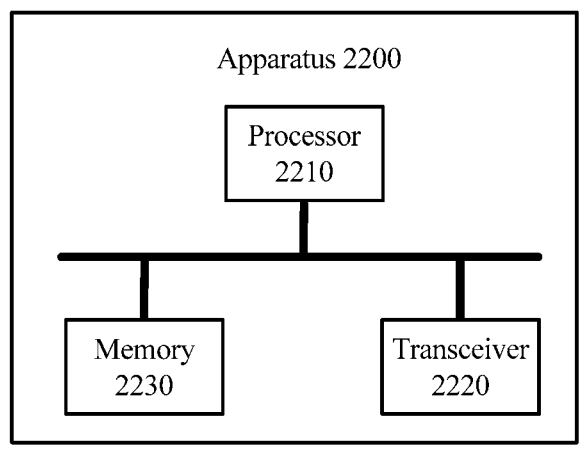
FIG. 29 is a schematic diagram of still another reference signal indication apparatus according to an embodiment of this application.

FIG. 29 shows still another reference signal indication apparatus 2200 according to an embodiment of this application. The apparatus 2200 includes a processor 2210, a transceiver 2220, and a memory 2230. The processor 2210, the transceiver 2220, and the memory 2230 communicate with each other by using an internal connection path. The memory 2230 is configured to store an instruction. The processor 2210 is configured to execute the instruction stored in the memory 2230, to control the transceiver 2220 to transmit a signal and/or receive a signal.

The transceiver 2220 is configured to receive a PTRS transmitted by a terminal device based on a time domain density, where the time domain density is a density in a DFT-s-OFDM waveform.

It should be understood that, the apparatus 2200 may be specifically the network device in the embodiment of the method 400, and may be configured to perform each step and/or procedure corresponding to the network device in the embodiment of the method 400. Optionally, the memory 2230 may include a ROM and a RAM, and provide an instruction and data to the processor. A part of the memory may further include a non-volatile RAM. For example, the memory may further store information of a device type. The processor 2210 may be configured to execute the instruction stored in the memory, and when the processor 2210 executes the instruction stored in the memory, the processor 2210 is configured to perform each step and/or procedure corresponding to the network device in the embodiment of the method 400.

Figure 30:
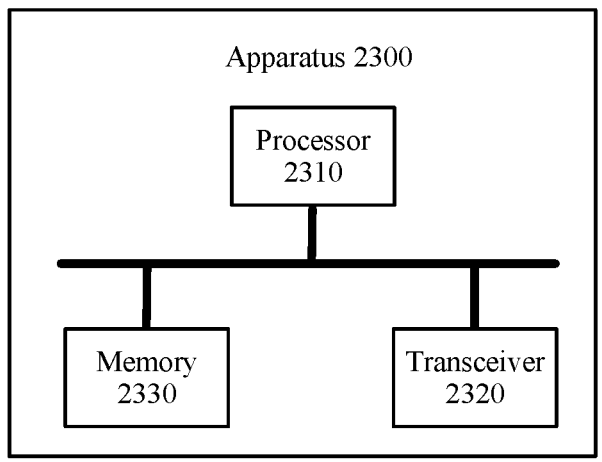
FIG. 30 is a schematic diagram of still another reference signal indication apparatus according to an embodiment of this application.

FIG. 30 shows still another reference signal indication apparatus 2300 according to an embodiment of this application. The apparatus 2300 includes a processor 2310, a transceiver 2320, and a memory 2330. The processor 2310, the transceiver 2320, and the memory 2330 communicate with each other by using an internal connection path. The memory 2330 is configured to store an instruction. The processor 2310 is configured to execute the instruction stored in the memory 2330, to control the transceiver 2320 to transmit a signal and/or receive a signal.

The processor 2310 is configured to determine a time domain density for transmitting a PTRS. The transceiver 2320 is configured to transmit the PTRS to a network device based on the time domain density, where the time domain density is a density in a DFT-s-OFDM waveform.

It should be understood that, the apparatus 2300 may be specifically the terminal device in the embodiment of the method 400, and may be configured to perform each step and/or procedure corresponding to the terminal device in the embodiment of the method 400. Optionally, the memory 2330 may include a ROM and a RAM, and provide an instruction and data to the processor. A part of the memory may further include a non-volatile RAM. For example, the memory may further store information of a device type. The processor 2310 may be configured to execute the instruction stored in the memory, and when the processor 2310 executes the instruction stored in the memory, the processor 2310 is configured to perform each step and/or procedure corresponding to the terminal device in the embodiment of the method 400.

Figure 31:
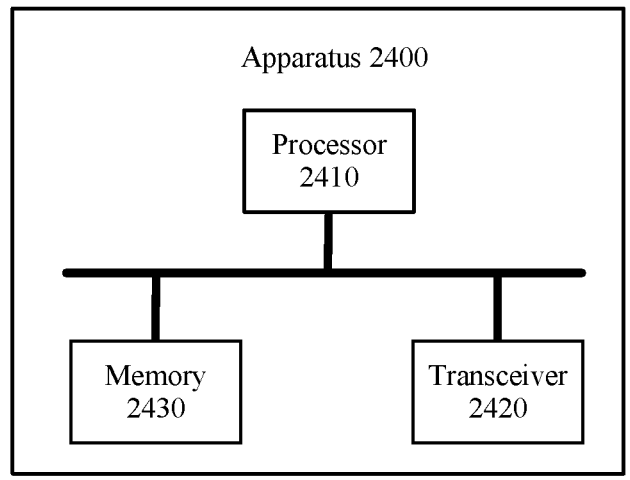
FIG. 31 is a schematic diagram of still another reference signal indication apparatus according to an embodiment of this application.

FIG. 31 shows still another reference signal indication apparatus 2400 according to an embodiment of this application. The apparatus 2400 includes a processor 2410, a transceiver 2420, and a memory 2430. The processor 2410, the transceiver 2420, and the memory 2430 communicate with each other by using an internal connection path. The memory 2430 is configured to store an instruction. The processor 2410 is configured to execute the instruction stored in the memory 2430, to control the transceiver 2420 to transmit a signal and/or receive a signal.

The transceiver 2420 is configured to transmit density switch information to a terminal device, where the density switch information is used to indicate that the terminal device or the apparatus is to switch between a first density mode and a second density mode, the first density mode is a highest time domain density used for transmitting a PTRS by the terminal device or the apparatus, and/or a highest frequency domain density used for transmitting a PTRS by the terminal device or the apparatus, the second density mode is a time domain density and/or a frequency domain density used for transmitting a PTRS by the terminal device or the apparatus and determined by the terminal device based on a correspondence, and the correspondence is used to indicate a correspondence between a transmission parameter and at least one time domain density value, and/or at least one frequency domain density value.

It should be understood that, the apparatus 2400 may be specifically the network device in the embodiments of the method 500 and the method 600, and may be configured to perform each step and/or procedure corresponding to the network device in the embodiments of the method 500 and the method 600. Optionally, the memory 2430 may include a ROM and a RAM, and provide an instruction and data to the processor. A part of the memory may further include a non-volatile RAM. For example, the memory may further store information of a device type. The processor 2410 may be configured to execute the instruction stored in the memory, and when the processor 2410 executes the instruction stored in the memory, the processor 2410 is configured to perform each step and/or procedure corresponding to the network device in the embodiments of the method 500 and the method 600.

Figure 32:
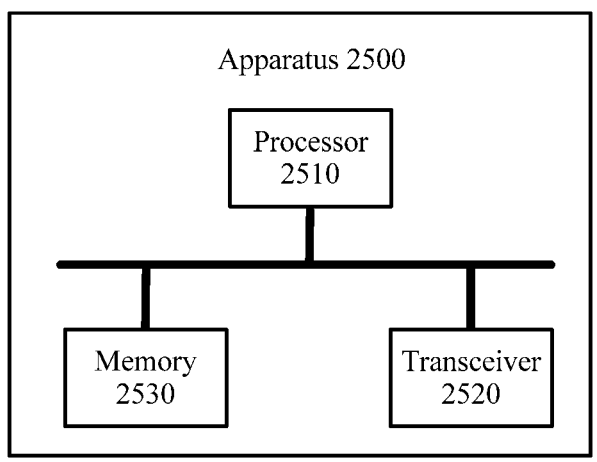
FIG. 32 is a schematic diagram of still another reference signal indication apparatus according to an embodiment of this application.

FIG. 32 shows still another reference signal indication apparatus 2500 according to an embodiment of this application. The apparatus 2500 includes a processor 2510, a transceiver 2520, and a memory 2530. The processor 2510, the transceiver 2520, and the memory 2530 communicate with each other by using an internal connection path. The memory 2530 is configured to store an instruction. The processor 2510 is configured to execute the instruction stored in the memory 2530, to control the transceiver 2520 to transmit a signal and/or receive a signal.

The transceiver 2520 is configured to receive density switch information transmitted by a network device, where the density switch information is used to indicate that the network device or the apparatus is to switch between a first density mode and a second density mode, the first density mode is a highest time domain density used for transmitting a PTRS by the network device or the apparatus, and/or a highest frequency domain density used for transmitting a PTRS by the network device or the apparatus, the second density mode is a time domain density and/or a frequency domain density used for transmitting a PTRS by the network device or the apparatus and determined by the apparatus based on a correspondence, and the correspondence is used to indicate a correspondence between a transmission parameter and at least one time domain density value, and/or at least one frequency domain density value. The processor 2510 is configured to determine, based on the density switch information, a target density mode used for transmitting the PTRS by the network device or the apparatus, where the target density mode is the first density mode or the second density mode. The processor 2510 is further configured to determine, based on the target density mode, the time domain density and/or the frequency domain density for transmitting the PTRS by the network device or the apparatus.

It should be understood that, the apparatus 2500 may be specifically the terminal device in the embodiments of the method 500 and the method 600, and may be configured to perform each step and/or procedure corresponding to the terminal device in the embodiments of the method 500 and the method 600. Optionally, the memory 2530 may include a ROM and a RAM, and provide an instruction and data to the processor. A part of the memory may further include a non-volatile RAM. For example, the memory may further store information of a device type. The processor 2510 may be configured to execute the instruction stored in the memory, and when the processor 2510 executes the instruction stored in the memory, the processor 2510 is configured to perform each step and/or procedure corresponding to the terminal device in the embodiments of the method 500 and the method 600.

Figure 33:
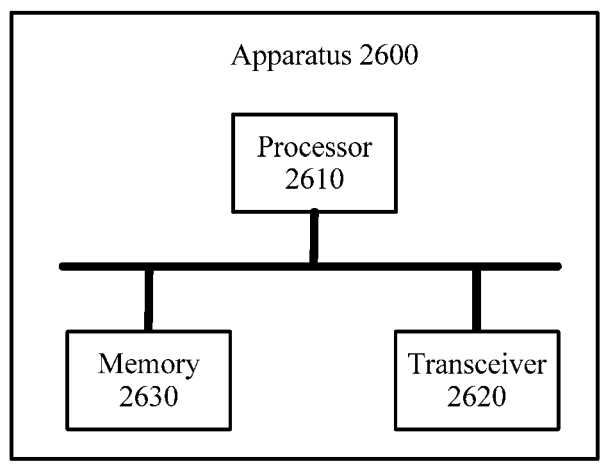
FIG. 33 is a schematic diagram of still another reference signal indication apparatus according to an embodiment of this application.

FIG. 33 shows still another reference signal indication apparatus 2600 according to an embodiment of this application. The apparatus 2600 includes a processor 2610, a transceiver 2620, and a memory 2630. The processor 2610, the transceiver 2620, and the memory 2630 communicate with each other by using an internal connection path. The memory 2630 is configured to store an instruction. The processor 2610 is configured to execute the instruction stored in the memory 2630, to control the transceiver 2620 to transmit a signal and/or receive a signal.

The transceiver 2620 is configured to transmit first configuration information to a first terminal device, where the first configuration information is used to indicate that the first terminal device or the apparatus is to transmit a ZP-PTRS on a time domain resource and/or a frequency domain resource. The transceiver 2620 is further configured to receive the ZP-PTRS transmitted by the first terminal device based on the first configuration information.

It should be understood that, the apparatus 2600 may be specifically the network device in the embodiments of the method 700 and the method 800, and may be configured to perform each step and/or procedure corresponding to the network device in the embodiments of the method 700 and the method 800. Optionally, the memory 2630 may include a ROM and a RAM, and provide an instruction and data to the processor. A part of the memory may further include a non-volatile RAM. For example, the memory may further store information of a device type. The processor 2610 may be configured to execute the instruction stored in the memory, and when the processor 2610 executes the instruction stored in the memory, the processor 2610 is configured to perform each step and/or procedure corresponding to the network device in the embodiments of the method 700 and the method 800.

Figure 34:
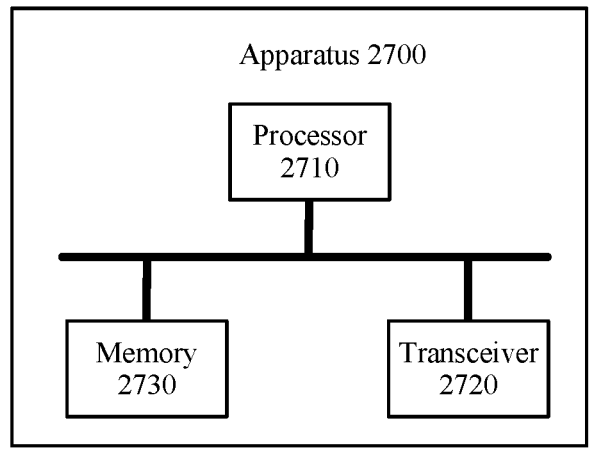
FIG. 34 is a schematic diagram of still another reference signal indication apparatus according to an embodiment of this application.

FIG. 34 shows still another reference signal indication apparatus 2700 according to an embodiment of this application. The apparatus 2700 includes a processor 2710, a transceiver 2720, and a memory 2730. The processor 2710, the transceiver 2720, and the memory 2730 communicate with each other by using an internal connection path. The memory 2730 is configured to store an instruction. The processor 2710 is configured to execute the instruction stored in the memory 2730, to control the transceiver 2720 to transmit a signal and/or receive a signal.

The transceiver 2720 is configured to receive first configuration information transmitted by a network device, where the first configuration information is used to indicate that the network device or the apparatus is to transmit a ZP-PTRS on a time domain resource and/or a frequency domain resource. The transceiver 2720 is further configured to transmit the ZP-PTRS to the network device based on the first configuration information, or receive the ZP-PTRS transmitted by the network device based on the first configuration information.

It should be understood that, the apparatus 2700 may be specifically the terminal device in the embodiments of the method 700 and the method 800, and may be configured to perform each step and/or procedure corresponding to the terminal device in the embodiments of the method 700 and the method 800. Optionally, the memory 2730 may include a ROM and a RAM, and provide an instruction and data to the processor. A part of the memory may further include a non-volatile RAM. For example, the memory may further store information of a device type. The processor 2710 may be configured to execute the instruction stored in the memory, and when the processor 2710 executes the instruction stored in the memory, the processor 2710 is configured to perform each step and/or procedure corresponding to the terminal device in the embodiments of the method 700 and the method 800.

Figure 35:
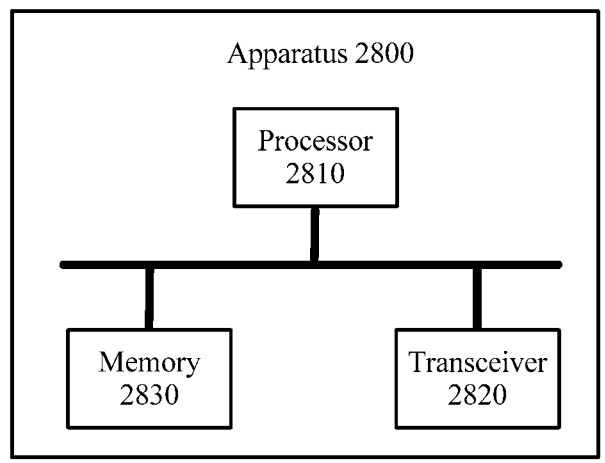
FIG. 35 is a schematic diagram of still another reference signal indication apparatus according to an embodiment of this application.

FIG. 35 shows still another reference signal indication apparatus 2800 according to an embodiment of this application. The apparatus 2800 includes a processor 2810, a transceiver 2820, and a memory 2830. The processor 2810, the transceiver 2820, and the memory 2830 communicate with each other by using an internal connection path. The memory 2830 is configured to store an instruction. The processor 2810 is configured to execute the instruction stored in the memory 2830, to control the transceiver 2820 to transmit a signal and/or receive a signal.

The transceiver 2820 is configured to transmit third indication information to a terminal device, where the third indication information is used to indicate a time domain density subset and/or a frequency domain density subset used for transmitting a PTRS by the terminal device or the apparatus.

It should be understood that, the apparatus 2800 may be specifically the network device in the embodiment of the method 900, and may be configured to perform each step and/or procedure corresponding to the network device in the embodiment of the method 900. Optionally, the memory 2830 may include a ROM and a RAM, and provide an instruction and data to the processor. A part of the memory may further include a non-volatile RAM. For example, the memory may further store information of a device type. The processor 2810 may be configured to execute the instruction stored in the memory, and when the processor 2810 executes the instruction stored in the memory, the processor 2810 is configured to perform each step and/or procedure corresponding to the network device in the embodiment of the method 900.

Figure 36:
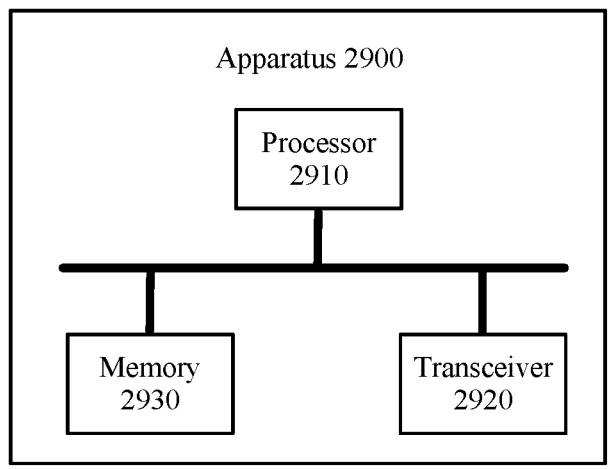
FIG. 36 is a schematic diagram of still another reference signal indication apparatus according to an embodiment of this application.

FIG. 36 shows still another reference signal indication apparatus 2900 according to an embodiment of this application. The apparatus 2900 includes a processor 2910, a transceiver 2920, and a memory 2930. The processor 2910, the transceiver 2920, and the memory 2930 communicate with each other by using an internal connection path. The memory 2930 is configured to store an instruction. The processor 2910 is configured to execute the instruction stored in the memory 2930, to control the transceiver 2920 to transmit a signal and/or receive a signal.

The transceiver 2920 is configured to receive third indication information transmitted by a network device, where the third indication information is used to indicate a time domain density subset and/or a frequency domain density subset used for transmitting a PTRS by the network device or the apparatus. The processor 2910 is configured to determine, based on the third indication information, the time domain density subset and/or the frequency domain density subset used for transmitting the PTRS by the network device or the apparatus.

It should be understood that, the apparatus 2900 may be specifically the terminal device in the embodiment of the method 900, and may be configured to perform each step and/or procedure corresponding to the terminal device in the embodiment of the method 900. Optionally, the memory 2930 may include a ROM and a RAM, and provide an instruction and data to the processor. A part of the memory may further include a non-volatile RAM. For example, the memory may further store information of a device type. The processor 2910 may be configured to execute the instruction stored in the memory, and when the processor 2910 executes the instruction stored in the memory, the processor 2910 is configured to perform each step and/or procedure corresponding to the terminal device in the embodiment of the method 900.

It should be understood that, the transceiver may include a transmitter and a receiver. The transceiver may further include an antenna, and there may be one or more antennas. The memory may be a separate component, or may be integrated in the processor. Each of the foregoing components or some components may be integrated in a chip for implementation, for example, integrated in a baseband chip for implementation.

It should also be understood that, in the embodiment of this application, the processor in the foregoing apparatus may be a central processing unit (CPU), or the processor may be another general purpose processor, a digital signal processor (DSP), an ASIC, a field programmable gate array (FPGA) or another programmable logic device, a discrete gate or transistor logic device, a discrete hardware component, or the like. The general purpose processor may be a microprocessor, or the processor may be any conventional processor or the like.

In an implementation process, steps of the foregoing methods can be implemented by using a hardware integrated logic circuit in the processor, or by using instructions in a form of software. The steps of the methods disclosed with reference to the embodiments of this application may be directly performed by a hardware processor, or may be performed by using a combination of hardware in the processor and a software unit. The software unit may be located in a mature storage medium in the art, such as a RAM, a flash memory, a ROM, a programmable ROM, an electrically erasable programmable memory, or a register. The storage medium is located in the memory. The processor executes instructions in the memory and completes the steps of the foregoing methods in combination with hardware of the processor. Details are not described again herein to avoid repetition.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described again herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reference signal indication method, comprising:
    transmitting, by a network device, a signaling to a terminal device, wherein the signaling indicates a one-to-one correspondence between a plurality of scheduled bandwidth intervals and a plurality of time domain densities;
    determining, by the network device, a time domain density for receiving a phase tracking reference signal (PTRS) based on the one-to-one correspondence and a scheduled bandwidth of the terminal device;
    receiving, by the network device, the PTRS from the terminal device based on the time domain density, wherein the time domain density is a density in a discrete Fourier transform spread orthogonal frequency division multiplexing (DFT-s-OFDM) waveform.

2. The method according to claim 1, wherein the time domain density is specifically a time domain density on a sampling point level.

3. The method according to claim 1, wherein the signaling is radio resource control signaling.

4. The method according to claim 2, wherein the time domain density on the sampling point level is a quantity of PTRS sampling points in a DFT-s-OFDM symbol.

5. The method according to claim 4, wherein the PTRS sampling points are distributed in the DFT-s-OFDM symbol based on a block, and each block comprises a plurality of PTRS consecutive sampling points.

6. A reference signal indication method, comprising:
    receiving, by a terminal device, a signaling from a network device, wherein the signaling indicates a one-to-one correspondence between a plurality of scheduled bandwidth intervals and a plurality of time domain densities;
    determining, by the terminal device, a time domain density for transmitting a phase tracking reference signal (PTRS) based on the one-to-one correspondence and a scheduled bandwidth of the terminal device;
    transmitting, by the terminal device, the PTRS to the network device based on the time domain density, wherein the time domain density is a density in a discrete Fourier transform spread orthogonal frequency division multiplexing (DFT-s-OFDM) waveform.

7. The method according to claim 6, wherein the time domain density is specifically a time domain density on a sampling point level.

8. The method according to claim 6, wherein the signaling is a radio resource control signaling.

9. The method according to claim 7, wherein the time domain density on the sampling point level is a quantity of PTRS sampling points in a DFT-s-OFDM symbol.

10. The method according to claim 9, wherein the PTRS sampling points are distributed in the DFT-s-OFDM symbol based on a block, and each block comprises a plurality of PTRS consecutive sampling points.

11. A communication apparatus, comprising:
    a transmitter, configured to transmit a signaling to a terminal device, wherein the signaling indicates a one-to-one correspondence between a plurality of scheduled bandwidth intervals and a plurality of time domain densities;
    a processor, configured to determine a time domain density for receiving a phase tracking reference signal (PTRS) based on the one-to-one correspondence and a scheduled bandwidth of the terminal device;
    a receiver, configured to receive the PTRS from the terminal device based on the time domain density, wherein the time domain density is a density in a discrete Fourier transform spread orthogonal frequency division multiplexing (DFT-s-OFDM) waveform.

12. The apparatus according to claim 11, wherein the time domain density is specifically a time domain density on a sampling point level.

13. The apparatus according to claim 11, wherein the signaling is a radio resource control signaling.

14. The apparatus according to claim 12, wherein the time domain density on the sampling point level is a quantity of PTRS sampling points in a DFT-s-OFDM symbol.

15. A communication device, comprising:
    a receiver, configured to receive a signaling from a network device, wherein the signaling indicates a one-to-one correspondence between a plurality of scheduled bandwidth intervals and a plurality of time domain densities;
    a processor, configured to determine a time domain density for transmitting a phase tracking reference signal (PTRS) based on the one-to-one correspondence and a scheduled bandwidth of the communication device;

a transmitter, configured to transmit the PTRS to the network device based on the time domain density, wherein the time domain density is a density in a discrete Fourier transform spread orthogonal frequency division multiplexing (DFT-s-OFDM) waveform.

16. The device according to claim 15, wherein the time domain density is specifically a time domain density on a sampling point level.

17. The device according to claim 15, wherein the signaling is a radio resource control signaling.

18. The device according to claim 16, wherein the time domain density on the sampling point level is a quantity of PTRS sampling points in a DFT-s-OFDM symbol.

19. The apparatus according to claim 14, wherein the PTRS sampling points are distributed in the DFT-s-OFDM symbol based on a block, and each block comprises a plurality of PTRS consecutive sampling points.

20. The device according to claim 18, wherein the PTRS sampling points are distributed in the DFT-s-OFDM symbol based on a block, and each block comprises a plurality of PTRS consecutive sampling points.

* * * * *